(12) United States Patent
Boffa et al.

(10) Patent No.: US 10,175,147 B2
(45) Date of Patent: Jan. 8, 2019

(54) METHOD AND APPARATUS FOR CHECKING TYRES FOR VEHICLE WHEELS

(71) Applicant: PIRELLI TYRE S.P.A., Milan (IT)

(72) Inventors: Vincenzo Boffa, Milan (IT); Luca Tersi, Imola (IT); Valeriano Ballardini, Imola (IT)

(73) Assignee: PIRELLI TYRE S.P.A., Milan (IT)

( * ) Notice: Subject to any disclaimer, the term of this patent is extended or adjusted under 35 U.S.C. 154(b) by 0 days.

(21) Appl. No.: 15/776,775

(22) PCT Filed: Nov. 29, 2016

(86) PCT No.: PCT/IB2016/057184
§ 371 (c)(1),
(2) Date: May 16, 2018

(87) PCT Pub. No.: WO2017/093892
PCT Pub. Date: Jun. 8, 2017

(65) Prior Publication Data
US 2018/0328820 A1     Nov. 15, 2018

(30) Foreign Application Priority Data
Nov. 30, 2015  (IT) .............................. UB2015A6028

(51) Int. Cl.
*G06K 9/32*         (2006.01)
*G01M 17/02*        (2006.01)
(Continued)

(52) U.S. Cl.
CPC ............. *G01M 17/027* (2013.01); *G06T 7/66* (2017.01); *G06T 7/70* (2017.01); *G06T 2207/10004* (2013.01); *G06T 2207/30172* (2013.01)

(58) Field of Classification Search
CPC .......... G01M 17/027; G06T 7/66; G06T 7/70; G06T 2207/10004; G06T 2207/30172
See application file for complete search history.

(56) References Cited

U.S. PATENT DOCUMENTS

| | | | |
|---|---|---|---|
| 9,610,810 B1* | 4/2017 | Singh ................... | B60C 23/0488 |
| 2010/0225463 A1* | 9/2010 | Fujita .................... | B60C 23/061 340/443 |
| 2017/0113495 A1* | 4/2017 | Singh .................... | B60C 11/246 |

FOREIGN PATENT DOCUMENTS

| | | | |
|---|---|---|---|
| EP | 2390621 A1 | 11/2011 | |
| EP | 2711693 A1 | 3/2014 | |

OTHER PUBLICATIONS

International Search Report for PCT/IB2016/057184 filed on Nov. 29, 2016 on behalf on Pirelli Tyre S.P.A. dated Mar. 20, 2017. 3 pages.

(Continued)

*Primary Examiner* — Jonathan S Lee
(74) *Attorney, Agent, or Firm* — Steinfl + Bruno LLP

(57) ABSTRACT

Method and apparatus for checking tires for vehicle wheels. A tire to be checked is fed to a checking station. A sidewall of the tire lies on a supporting portion of a rotating table. The supporting portion lies on a plane while the rotating table has a rotation axis perpendicular to the plane. A centring operation is carried out to align, in the plane, the rotation axis of the tire with the rotation axis of the rotating table. The centring operation includes identification, in the plane, of the rotation axis of the tire by: a) acquisition of an image of the tire laid on the supporting portion of the rotating table; b) definition, in the acquired image, of a number of analysis directions intersecting at one selected central point; c) for each analysis direction: c1) definition, in the acquired image, of a number of potential axes of symmetry, perpendicular to the analysis direction; c2) calculation of a level of symmetry (Continued)

of the image with respect to each potential axis of symmetry, where the level of symmetry is indicative of the probability that the center of the tire is on the respective potential axis of symmetry; c3) determination of a probability distribution indicative of a variation of the level of symmetry along the analysis direction; d) determination of a center of the tire on the basis of a cumulative probability distribution obtained through a combination of the probability distributions calculated for the analysis directions; e) identification of the rotation axis of the tire in an axis that passes through the determined center and perpendicular to the plane.

42 Claims, 8 Drawing Sheets

(51) Int. Cl.
    *G06T 7/66*         (2017.01)
    *G06T 7/70*         (2017.01)

(56)            References Cited

OTHER PUBLICATIONS

Written Opinion for PCT/IB2016/057184 filed on Nov. 29, 2016 on behalf of Pirelli Tyre S.P.A. dated Mar. 20, 2017. 7 pages.

\* cited by examiner

METHOD AND APPARATUS FOR CHECKING TYRES FOR VEHICLE WHEELS

CROSS-REFERENCE TO RELATED APPLICATIONS

The present application is the U.S. national stage of International Patent Application PCT/IB2016/057184 filed on Nov. 29, 2016 which, in turn, claims priority to Italian application UB2015A006028 filed on Nov. 30, 2015.

The invention concerns a method and apparatus for checking tyres for vehicle wheels.

The invention also concerns a method for estimating the position of the centre of a tyre for vehicle wheels.

The present invention is in the field of checks carried out on tyres, preferably moulded and vulcanized, adapted for verifying that they comply with the design specifications and, in particular, for detecting possible external defects (on the radially outer and/or radially inner surfaces) and/or defects inside the structure of the tyre and thus for allowing the compliant ones to be sent to storage and the defective ones to be discharged.

A tyre for vehicle wheels typically comprises a carcass structure, shaped according to a substantially toroidal configuration, comprising at least one carcass ply having respectively opposite end portions. The latter are engaged at respective annular anchoring structures, each normally formed by at least one substantially circumferential annular insert called "bead core" on which at least one filling insert is generally applied, tapering radially away from the axis of rotation. The annular anchoring structures are arranged in areas usually identified with the name "beads". The beads have an internal diameter substantially corresponding to a so-called "fitting diameter" of the tyre on a respective mounting rim. The tyre also comprises a crown structure comprising at least one belt strip arranged in position radially outside the carcass ply with respect to the axis of rotation of the tyre and a tread band radially outside the belt strip. Longitudinal and transversal grooves are typically shaped into the tread band, arranged to define a desired tread pattern. Between the tread band and the belt strip(s) there can be a so-called "under-layer" made of elastomeric material having properties suitable for ensuring a stable connection of the belt strip(s) with the tread band itself. The tyre also comprises a pair of so-called sidewalls made of elastomeric material that represent the axially outer surfaces of the tyre, with respect to a middle plane perpendicular to the axis of rotation of the same tyre. For example, the sidewalls represent the axially outer surfaces with respect to the annular anchoring structures, to the carcass ply(-ies), to the belt strip(s) and possibly to at least one tread band portion. In "tubeless" tyres, in a radially inner position with respect to the carcass ply, there is at least one layer of elastomeric material, usually called "liner", having air-tightness characteristics and generally extending from one bead to another.

The production cycles of a tyre provide that, after a building process in which the various structural components of the tyre itself are made and/or assembled, the built green tyres are transferred in a moulding and vulcanization line where a moulding and vulcanization process is carried out, adapted for defining the structure of the tyre according to a desired geometry and tread pattern.

The term "elastomeric material" is meant to indicate a composition comprising at least one elastomeric polymer and at least one reinforcing filler. Such a composition can also comprise additives like, for example, a cross-linking agent and/or a plasticizer. Thanks to the presence of the cross-linking agent, such a material can be cross-linked through heating, so as to form the final manufactured product.

The term "green tyre" is meant to indicate a tyre obtained by the building process and not yet moulded and vulcanized.

The term "finished tyre" is meant to indicate a finished tyre obtained from the building process and subsequently moulded and vulcanized.

The term "tyre" is meant to indicate a finished tyre or a green tyre.

The term "model" of a tyre is meant to indicate a set of geometric characteristics that distinguish a tyre, in other words, for example, width of the tread band, height of the sidewalls, fitting diameter and/or external diameter.

The terms "axial", "axially", "radial", "radially", "circumferential" and "circumferentially" are used with reference to the tyre.

In particular, the terms "axial" and "axially" are meant as references/magnitudes arranged/measured or extending in a direction substantially parallel to the axis of rotation of the tyre.

The terms "radial" and "radially" are meant as references/magnitudes arranged/measured or extending in a direction that intersects the axis of rotation of the tyre and lies in a plane perpendicular to such an axis of rotation.

The terms "circumferential" and "circumferentially" are meant as references/magnitudes arranged/measured or extending along a circumference developing around the axis of rotation of the tyre.

The term "axial half of the tyre" is meant to indicate a half of the tyre delimited by an axial middle plane perpendicular to the axis of rotation of the tyre and equidistant from the beads of the tyre itself.

The term "at least one axial half of the tyre" is meant to indicate a complete half as defined above plus, possibly, a further portion of the other half that extends axially from the aforementioned middle plane.

The terms "lower", "upper", "low", "high", "above" identify the relative position of an element, like for example a component of a tyre, a tyre, an apparatus, a device, etc., with respect to the ground or of one of said elements with respect to another element.

The term "two-dimensional image" is meant to indicate a digital image made up of a matrix of pixels, wherein each pixel is associated with a pair of coordinates k,l (representing the row and column indices of the matrix) and a value of a quantity, like for example the intensity of grey or of colour of the pixel or the distance of the pixel from a predetermined point.

The term "side view" relative to a tyre, is meant to indicate a view that enables to comprise at least sidewall and/or bead and/or a shoulder portion of the tyre.

Preferably, it means a view substantially according to the axis of rotation of the tyre.

In a production process, the tyres are subjected to checks in order to verify the possible presence of defects and/or production anomalies.

EP 2 390 621 discloses a tyre appearance inspection apparatus comprising a rotating table and a set of cameras adapted for acquiring images of respective inner surface regions of the tyre, during the rotation of the tyre on the rotating table. The effects of a possible misalignment between the centre of the tyre and the axis of rotation of the rotating table are eliminated automatically, from the images acquired during the rotation of the tyre, by a suitable processing of the images themselves.

EP 2 711 693 discloses a method for detecting a convex defect in a contact area of a tire comprising tread pattern elements. Such a method comprises the acquisition of two-dimensional images of a region of the tyre by irradiating the tread of the tyre with a slit light during the rotation of the tyre on a rotating table.

The acquired images are subjected to various processing steps, including a step of elimination of the effects of an eccentricity due to a misalignment between the centre of the tyre and the axis of rotation of the rotating table.

The Applicant has observed that the checks can be carried out in suitable checking stations that can comprise a rotating table on which the tyre is made to rotate with respect to suitable image acquisition devices, adapted for acquiring images of the surface of the tyre for the entire circumference of the tyre. In such stations, for the purposes of accurate acquisition of the images, it is important for the centre of the tyre to be centred with respect to the axis of rotation of the rotating table.

The Applicant has noted that the methods described by EP 2 390 621 and EP 2 711 693 for managing a misalignment between axis of rotation of the tyre and axis of rotation of the rotating table are based on a correction a posteriori of the misalignment. In particular, such methods foresee the acquisition of images of the tyre while it is in rotation on the rotating table, the analysis of the acquired images to determine the presence of a possible misalignment between the centre of the tyre and the axis of rotation of the table and a processing of the acquired images to correct a posteriori the effects of such a misalignment on such images.

The Applicant has perceived that with such a type of correction a posteriori there is the risk, especially in the case of use of cameras with limited depth of field and/or field of view that, in the presence of a misalignment between the centre of the tyre and the axis of rotation of the table, the acquired images are not properly focused and/or are not correctly positioned in the field of view of the camera. This can compromise the accuracy and reliability of the processing carried out on such images.

Moreover, in plants that produce a large number of different models of tyres, the Applicant has observed that in order to carry out accurate checks, capable of even detecting defects that are very small and/or located in regions (for example of the radially inner surface) of the tyre that are difficult for the image acquisition devices to access, it is essential for the devices used for the acquisition of images when the tyre is in rotation on the rotating table to be positioned as close as possible to such regions. This is in order to ensure the acquisition of precise images, in high resolution and properly focused, at the same time avoiding carrying out improper manoeuvres that could damage the devices themselves. In particular, the Applicant has observed that the positioning of such image acquisition devices must be accurately adjusted according to the geometric characteristics of the specific model of tyre being checked so as to take into account, for example, more or less rounded sidewalls, more or less pronounced sidewall height and similar.

In such a context, in which the image acquisition devices are positioned in positions very close to the tyre and the manoeuvring spaces of the devices are very narrow, the aforementioned a posteriori correction techniques of the misalignment between the axes of rotation of the tyre and of the rotating table are risky. Indeed, in the case of misalignment, there is the risk that the tyre, during the rotation on the rotating table, might collide with the image acquisition devices.

The Applicant has perceived that the above problems can be overcome through a solution that enables to determine a priori a possible misalignment between the axis of rotation of the tyre and the axis of rotation of the rotating table and, in the case of misalignment, to align the axis of rotation of the tyre with the axis of rotation of the rotating table, before the rotation of the tyre on such a table for the purposes of the acquisition of images for checking.

More precisely, the Applicant has found that such problems can be overcome through a centring procedure, adapted for aligning the axis of rotation of the tyre with the axis of rotation of the rotating table, which comprises the estimation of the position of the axis of rotation of the tyre. Such an estimation is carried out through the acquisition, according to a side view, of an image of the tyre with a sidewall laid on a supporting portion of a rotating table and the processing of the image thus acquired. The processing of the image comprises: the determination of a cumulative probability distribution that combines probability distributions indicative of the probability that, for respective analysis directions of the image, the centre of the tyre is located on potential axes of symmetry perpendicular to such analysis directions.

In accordance with a first aspect thereof, the invention relates to a method for checking tyres for vehicle wheels, each tyre having an axis of rotation.

Preferably, it is provided to feed a tyre to be checked to a checking station with a sidewall of the tyre laid on a supporting portion of a rotating table, in which the supporting portion lies on a plane and the rotating table has an axis of rotation perpendicular to said plane.

Preferably, it is provided to carry out a centring operation adapted to align, in said plane, the axis of rotation of the tyre with the axis of rotation of the rotating table.

Preferably, the centring operation comprises the identification, in said plane, of the axis of rotation of the tyre.

Preferably, the identification of the axis of rotation of the tyre comprises a) acquiring, according to a side view, an image of the tyre laid on said supporting portion of the rotating table.

Preferably, the identification of the axis of rotation of the tyre comprises b) defining, in the acquired image, a number n of analysis directions $\alpha_1, \alpha_2, \ldots \alpha_i, \ldots \alpha_n$ intersecting at one selected central point, with n and i integers, n>1 and $1 \leq i \leq n$.

Preferably, the identification of the axis of rotation of the tyre comprises in c), for each analysis direction $\alpha_i$:
- c1) defining, in the acquired image, a number m of potential axes of symmetry $s_{i1}, s_{i2}, \ldots s_{ij}, \ldots s_{im}$, perpendicular to the analysis direction $\alpha_i$, where m and j are integers, with m>1 and $1 \leq j \leq m$, and
- c2) calculating a level of symmetry of the image with respect to each of said potential axes of symmetry $s_{i1}, s_{i2}, \ldots s_{ij}, \ldots s_{im}$, in which said level of symmetry is indicative of the probability that the centre of the tyre is located on the respective potential axis of symmetry $s_{i1}, s_{i2}, \ldots s_{ij}, \ldots s_{im}$;
- c3) determining a probability distribution $P^{\alpha i}$ indicative of a variation of said level of symmetry along said analysis direction $\alpha_i$.

Preferably, in d) a centre of the tyre is determined on the basis of a cumulative probability distribution $P^{merged}$ obtained through a combination of the probability distributions $P^{\alpha i}$ calculated for said analysis directions $\alpha_1, \alpha_2, \ldots \alpha_i, \ldots \alpha_n$.

Preferably in e) the axis of rotation of the tyre is identified in an axis that passes through said determined centre and is perpendicular to said plane.

The Applicant considers that the checking method according to the invention, identifying the axis of rotation of the tyre on the basis of an image taken according to a side view of a tyre (in other words on the basis of a side image of the tyre that can be acquired with a stationary rotating table) enables to determine a priori a possible misalignment between the axis of rotation of the tyre and the axis of rotation of the rotating table and, in the case of misalignment, to align the axis of rotation of the tyre with the axis of rotation of the rotating table, before setting the tyre in rotation on such a table for the purposes of the acquisition of images for checking.

This enables to make an industrial-scale automated system for checking tyres built/produced in any production plant, including plants that produce a large number of models of tyres, even ones that are very different from one another, meeting the requirements outlined above with particular regard to the accuracy, reliability and safety of the checks carried out on tyres in rotation on the rotating table.

In accordance with a second aspect thereof, the invention relates to an apparatus for checking tyres for vehicle wheels, each tyre having an axis of rotation.

Preferably, said apparatus comprises at least one checking station.

Preferably, said at least one checking station comprises a table rotating about an axis of rotation having a supporting portion configured to receive and support a sidewall of the tyre, the supporting portion lying on a plane perpendicular to the axis of rotation of the rotating table.

Preferably, said at least one checking station comprises image acquisition devices adapted to acquire, according to a side view, an image of the tyre laid on said supporting portion of the rotating table.

Preferably, said at least one checking station comprises an electronic unit configured to manage a centring operation adapted to align, in said plane, the axis of rotation of the tyre with the axis of rotation of the rotating table.

Preferably, the centring operation comprises the identification, in said plane, of the axis of rotation of the tyre.

Preferably, the identification of the axis of rotation of the tyre comprises defining, in the acquired image, a number n of analysis directions $\alpha_1, \alpha_2, \ldots \alpha_i, \ldots \alpha_n$ intersecting at one selected central point, with n and i integers, $n>1$ and $1 \leq i \leq n$.

Preferably, the identification of the axis of rotation of the tyre comprises, for each analysis direction $\alpha_i$:

defining in the acquired image a number m of potential axes of symmetry $s_{i1}, s_{i2}, \ldots s_{ij}, \ldots s_{im}$, perpendicular to the analysis direction $\alpha_i$, where m and j are integers, with $m>1$ and $1 \leq j \leq m$;

calculating a level of symmetry of the image with respect to each of said potential axes of symmetry $s_{i1}, s_{i2}, \ldots s_{ij}, \ldots s_{im}$, wherein said level of symmetry is indicative of the probability that the centre of the tyre is located on the respective potential axis of symmetry $s_{i1}, s_{i2}, \ldots s_{ij}, \ldots s_{im}$;

determining a probability distribution $P^{\alpha i}$ indicative of a variation of said level of symmetry along said analysis direction $\alpha_i$.

Preferably, the identification of the axis of rotation of the tyre comprises determining a centre of the tyre on the basis of a cumulative probability distribution $P^{merged}$ obtained through a combination of the probability distributions $P^{\alpha i}$ calculated for said analysis directions $\alpha_1, \alpha_2, \ldots \alpha_i, \ldots \alpha_n$.

Preferably, the axis of rotation of the tyre is identified in an axis that passes through said determined centre and is perpendicular to said plane.

In accordance with another aspect thereof, the invention concerns a method for estimating the position of the centre of a tyre for vehicle wheels.

Preferably, it is provided in a) to acquire, according to a side view, an image of the tyre with a sidewall laid on a supporting portion lying on a plane.

Preferably, it is provided in b) to define, in the acquired image, a number n of analysis directions $\alpha_1, \alpha_2, \ldots \alpha_i, \ldots \alpha_n$ intersecting at one selected central point, with n and i integers, $n>1$ and $1 \leq i \leq n$.

Preferably, in c), for each analysis direction $\alpha_i$, it is provided to:

c1) define, in the acquired image, a number m of potential axes of symmetry $s_{i1}, s_{i2}, \ldots s_{ij}, \ldots s_{im}$, perpendicular to the analysis direction $\alpha_i$, where m and j are integers, with $m>1$ and $1 \leq j \leq m$;

c2) calculate a level of symmetry of the image with respect to each of said potential axes of symmetry $s_{i1}, s_{i2}, \ldots s_{ij}, \ldots s_{im}$, wherein said level of symmetry is indicative of the probability that the centre of the tyre is located on the respective potential axis of symmetry $s_{i1}, s_{i2}, \ldots s_{ij}, \ldots s_{im}$;

c3) determine a probability distribution $P^{\alpha i}$ indicative of a variation of said level of symmetry along said analysis direction $\alpha_i$.

Preferably in d) the position of the centre of the tyre is determined on the basis of a cumulative probability distribution $P^{merged}$ obtained through a combination of the probability distributions $P^{\alpha i}$ calculated for said analysis directions $\alpha_1, \alpha_2, \ldots \alpha_i, \ldots \alpha_n$.

The Applicant considers that the method according to the present invention—exploiting the axial symmetry of the tyre—makes it possible to estimate the centre of the tyre with a procedure that at the same time is accurate (offering, preferably a precision of less than a millimeter), simple and fast. The possibility of iterating the procedure also enables to make the method increasingly accurate and robust with respect to possible undesired asymmetries and disturbances in the acquired image.

The Applicant also considers that the method according to the present invention, being based on the axial symmetry of the tyre and on the analysis of an image taken according to a side view thereof, enables to estimate the centre of the tyre without the need to make assumptions a priori on the shape thereof. This advantageously enables to accurately estimate the centre of the tyre even in the presence of an internal shape of the tyre that is not perfectly circular due, for example, to the presence of possible moulding burrs at the beads and/or to the deformation that a deflated tyre, resting on a supporting portion, can undergo in a variable and unpredictable manner.

The present invention in at least one of the aforementioned aspects can have at least one of the following preferred characteristics.

Preferably, said probability distribution $P^{\alpha i}$ is determined on the basis of said calculation of a level of symmetry of the image with respect to each of said potential axes of symmetry $s_{i1}, s_{i2}, \ldots s_{ij}, \ldots s_{im}$.

Preferably said supporting portion of the rotating table lies on a horizontal plane.

Preferably, said image of the tyre acquired according to said side view is a two-dimensional image.

According to a preferred embodiment, in d) the centre of the tyre is identified by determining a region of the image of maximum values of said cumulative probability distribution $P^{merged}$ and calculating the barycentre of said region.

Preferably, said region of the image of maximum values of said cumulative probability distribution $P^{merged}$ corresponds to a region of the image in which the cumulative probability distribution $P^{merged}$ takes probability values greater than a threshold.

Even more preferably said threshold can be predetermined as a function of a maximum value of $P^{merged}$.

Preferably, in d) the centre of the tyre is identified by selecting pixels of the image at which said cumulative probability distribution $P^{merged}$ takes values higher than a threshold, and calculating the barycentre of said pixels.

According to an alternative embodiment, in d) the centre of the tyre is identified by identifying a pixel of the image in which said cumulative probability distribution $P^{merged}$ has maximum value.

According to a preferred embodiment, it is provided to iterate from b) to d) a predetermined number of times greater than or equal to 1, each time taking as selected central point the centre of the tyre estimated in the immediately preceding iteration.

Preferably, at the first iteration the selected central point corresponds to the centre of the rotating table.

According to a preferred embodiment, at each iteration, the cumulative probability distribution $P^{merged}$ is obtained by analysing closer potential axes of symmetry $s_{i1}$, $s_{i2}$, . . . $s_{ij}$, . . . $s_{im}$ with respect to the immediately preceding iteration. This advantageously enables to simultaneously optimise accuracy and computing performance.

According to a preferred embodiment, at each iteration, the cumulative probability distribution $P^{merged}$ is obtained by analysing potential axes of symmetry $s_{i1}$, $s_{i2}$, . . . $s_{ij}$, . . . $s_{im}$ along a reduced excursion E with respect to the immediately preceding iteration, said excursion E extending along the analysis direction $\alpha_i$ and being centred in the selected central point. This advantageously enables to simultaneously optimise accuracy and computing performance.

Preferably, at each iteration, for each analysis direction $\alpha_i$ the same number m of potential axes of symmetry $s_{i1}$, $s_{i2}$, . . . $s_{ij}$, . . . $s_{im}$ is considered with respect to the immediately preceding iteration.

Preferably, at each iteration, said potential axes of symmetry $s_{i1}$, $s_{i2}$, . . . $s_{ij}$, . . . $s_{im}$ are equidistant within said excursion E.

Preferably, for each analysis direction $\alpha_i$ and for each potential axis of symmetry $s_{ij}$, the level of symmetry of the image with respect to each of said potential axes of symmetry $s_{i1}$, $s_{i2}$, . . . $s_{ij}$, . . . $s_{im}$ is calculated by analysing pixels of the acquired image that are located on opposite sides of the image with respect to the potential axis of symmetry $s_{i1}$.

According to a preferred embodiment, for each analysis direction $\alpha_i$ and for each potential axis of symmetry $s_{ij}$, the level of symmetry of the image with respect to each of said potential axes of symmetry $s_{i1}$, $s_{i2}$, . . . $s_{ij}$, . . . $s_{im}$ is calculated by analysing pixels of the acquired image that are located at two opposite sides of the image with respect to the potential axis of symmetry $s_{ij}$, the analysed pixels increasing in number at each iteration, with respect to the immediately preceding iteration. This enables to simultaneously optimise accuracy and computing performance.

Preferably, the analysed pixels are selected within a region of interest defined within the acquired image for each potential axis of symmetry $s_{ij}$ of each analysis direction $\alpha_i$.

Preferably, for each potential axis of symmetry $s_{ij}$, said region of interest is symmetrical with respect to said potential axis of symmetry $s_{ij}$.

Preferably, for each potential axis of symmetry $s_{ij}$ of each analysis direction $\alpha_i$, said region of interest is defined by the intersection between: an annulus having inner and outer radius respectively sized as a function of nominal values of the inner and outer radius of the tyre and a rectangle having major centreline on the analysis direction $\alpha_i$ and minor centreline on the potential axis of symmetry $s_{ij}$.

Preferably, said rectangle has a length w along the analysis direction $\alpha_i$ greater than or equal to the external diameter of the tyre and a height h along the potential axis of symmetry substantially equal to the external radius of the tyre.

Preferably, the internal radius of the annulus is comprised between 100% and 102% of the nominal value of the internal radius of the tyre. This is advantageous to exclude from the analysis possible moulding burrs at the beads.

Preferably, the external radius of the annulus is comprised between 100% and 102% of the nominal value of the external radius of the tyre. This advantageously enables to have cleaner transitions in the trend of the level of symmetry of the image with respect to each of said potential axes of symmetry.

According to a preferred embodiment, in c2) the calculation of the level of symmetry of the image with respect to each axis $s_{ij}$ of said potential axes of symmetry $s_{i1}$, $s_{i2}$, . . . $s_{ij}$, . . . $s_{im}$ comprises the calculation of a root mean square deviation $AS^{\alpha_i s_{ij}}$ between the intensity (for example, of grey) of pixels of the image that are located on one side with respect to the potential axis of symmetry $s_{ij}$ and the intensity of specular pixels located on the opposite side of the image with respect to the potential axis of symmetry $s_{ij}$.

Preferably, the calculation of the level of symmetry of the image with respect to each of said potential axes of symmetry $s_{i1}$, $s_{i2}$, . . . $s_{ij}$, . . . $s_{im}$ comprises the calculation of the second derivative of said root mean square deviation $AS^{\alpha_i s_{ij}}$.

Preferably, the calculation of the level of symmetry of the image with respect to each of said potential axes of symmetry $s_{i1}$, $s_{i2}$, . . . $s_{ij}$, . . . $s_{im}$ comprises the filtering of the second derivative.

Even more preferably said filtering of the second derivative is calculated by setting equal to zero all of the values of the second derivative that are below a threshold value.

Preferably, for each analysis direction $\alpha_i$, if the determined probability distribution $P^{\alpha i}$ has a maximum value lower than a predetermined threshold, the probability distribution $P^{\alpha i}$ is not considered in the obtainment of the cumulative probability distribution $P^{merged}$. This advantageously enables to discard unreliable or uncertain probability distributions.

In an alternative embodiment, said cumulative probability distribution $P^{merged}$ is obtained by combining all of the probability distributions $P^{\alpha i}$.

Preferably, in a) the image is acquired with stationary rotating table.

Preferably, in d) coordinates of the centre of the tyre are identified in a two-dimensional reference system of the image and said coordinates are converted into a three-dimensional Cartesian reference system of the rotating table.

Preferably, indeed, the system is calibrated and the distance of the upper surface of the tyre (sidewall facing upwards) from the image acquisition device (for example the camera) is known.

Preferably, the centring operation comprises the detection of a deviation, on said plane, between the axis of rotation of the rotating table and the axis of rotation of the tyre.

Preferably, in the presence of said deviation, the centring operation comprises the movement of the tyre on said plane, with respect to the axis of rotation of the rotating table (which remains stationary), until the axis of rotation of the tyre is substantially aligned with the axis of rotation of the rotating table.

Preferably, it is provided to move the tyre until said deviation is reduced below a predetermined value, preferably less than 1 mm, even more preferably less than 0.1 mm.

Preferably, after the centring operation, it is provided to rotate the rotating table together with the tyre about said axis of rotation of the rotating table and to carry out checks on said tyre while the rotating table and the tyre are in rotation.

Preferably, the image acquisition devices comprise a camera positioned so as to have the optical axis substantially coincident with the axis of rotation of the rotating table.

Preferably, the image acquisition devices comprise a camera positioned above the rotating table with the lens facing downwards (in other words towards the tyre laid on the supporting portion of the rotating table).

Preferably, the rotating table is mounted on a base so as to be able to rotate about said axis of rotation of the rotating table.

Preferably, said at least one checking station comprises a moving device configured to rotate the rotating table about said axis of rotation.

Preferably, the supporting portion of the rotating table is mobile in said plane, with respect to the axis of rotation of the rotating table, according to two directions x, y belonging to said plane.

Preferably, said two directions x, y are perpendicular.

Preferably, said at least one checking station comprises at least one actuator operatively connected to the supporting portion of the rotating table to move said supporting portion according to two directions x, y belonging to said plane.

Preferably, the electronic unit is configured to control said at least one actuator so as to move the supporting portion of the rotating table according to at least one of said two directions x, y until the axis of rotation of the tyre is substantially aligned with the axis of rotation of the rotating table.

Preferably, the rotating table comprises an endless conveyor movable along a first direction x of said two directions x, y and carrying said supporting portion.

Preferably, said endless conveyor can be moved for a predetermined stroke along a second direction y of said two directions x, y.

Preferably, the endless conveyor comprises a conveyor belt wound on a pair of rollers, wherein an upper surface of the conveyor belt defines the supporting portion.

Preferably, the endless conveyor comprises a plurality of motorised rollers, wherein the assembly of the upper surfaces of said motorised rollers defines said supporting portion.

Further characteristics and advantages of the present invention will become clear from the following detailed description of some example embodiments thereof, provided solely as non-limiting examples, said description being made with reference to the attached drawings, in which:

FIG. 1 schematically shows a plant for producing tyres for vehicle wheels;

Figure 3:
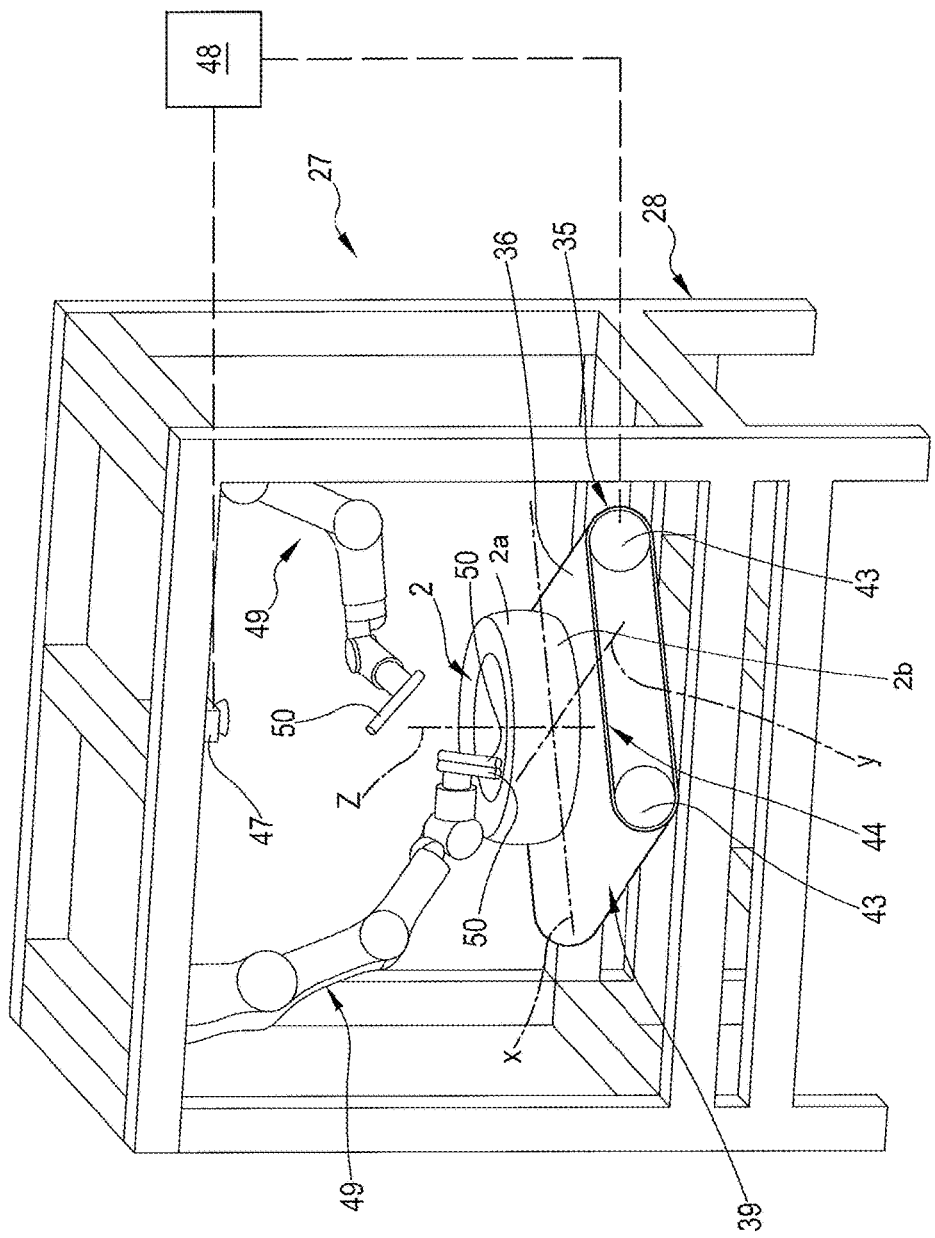
FIG. 3 shows a perspective view of a checking station of an apparatus for checking tyres belonging to the plant of FIG. 1.
Figure 4:
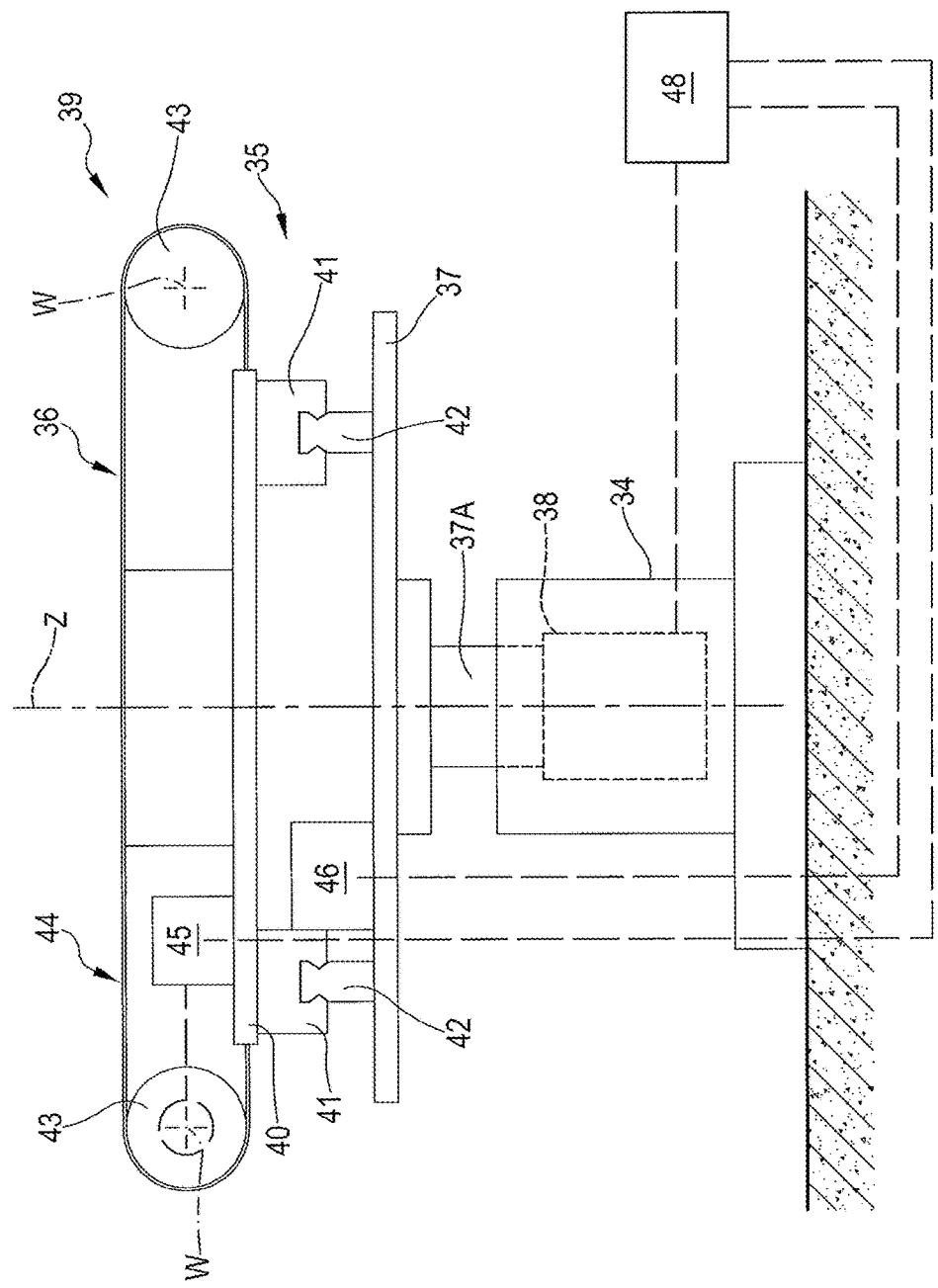
Figure 5:
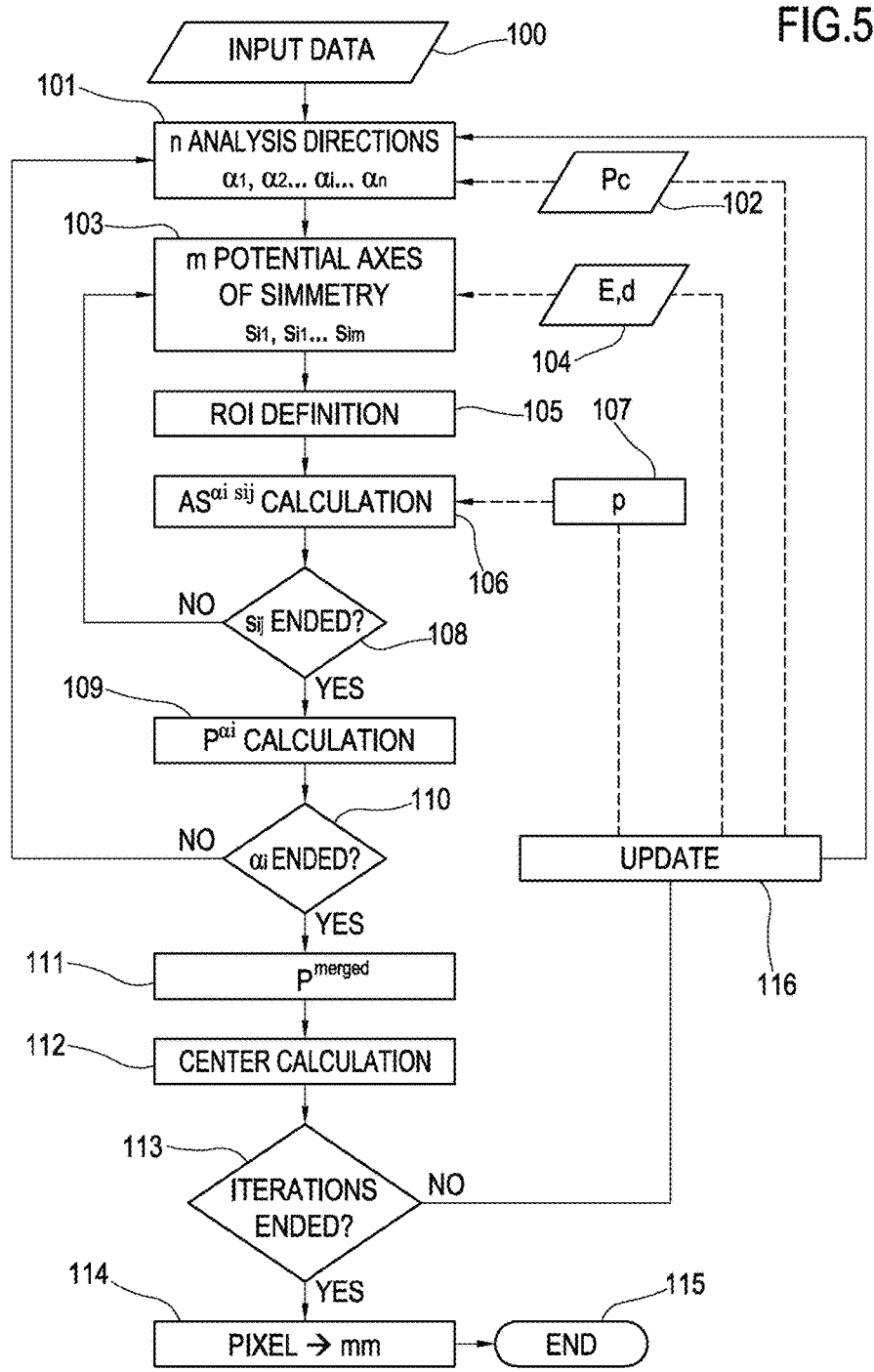
Figure 6:
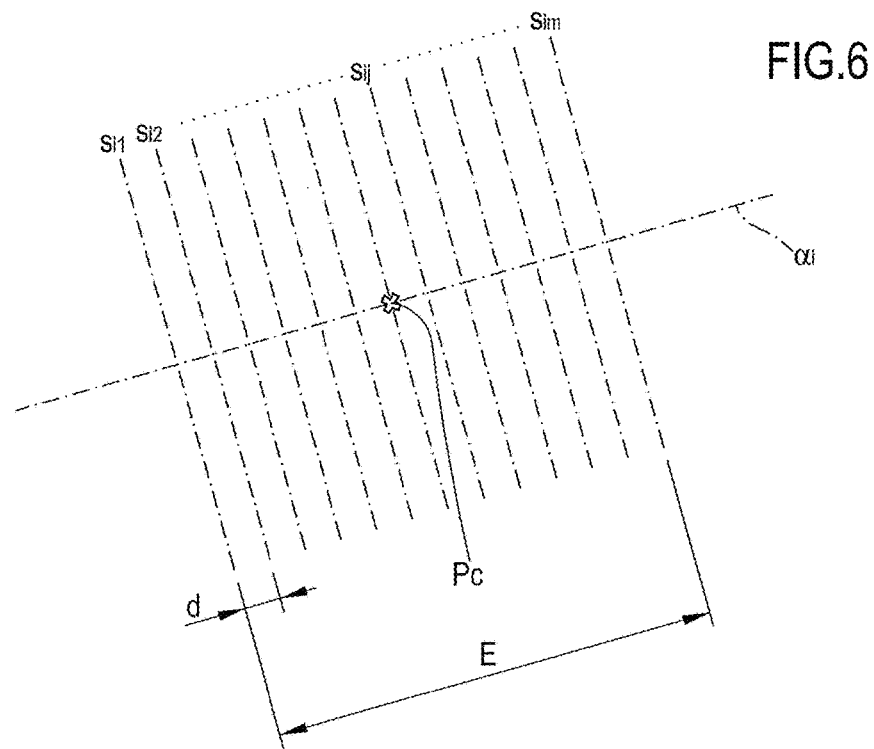
Figure 7:
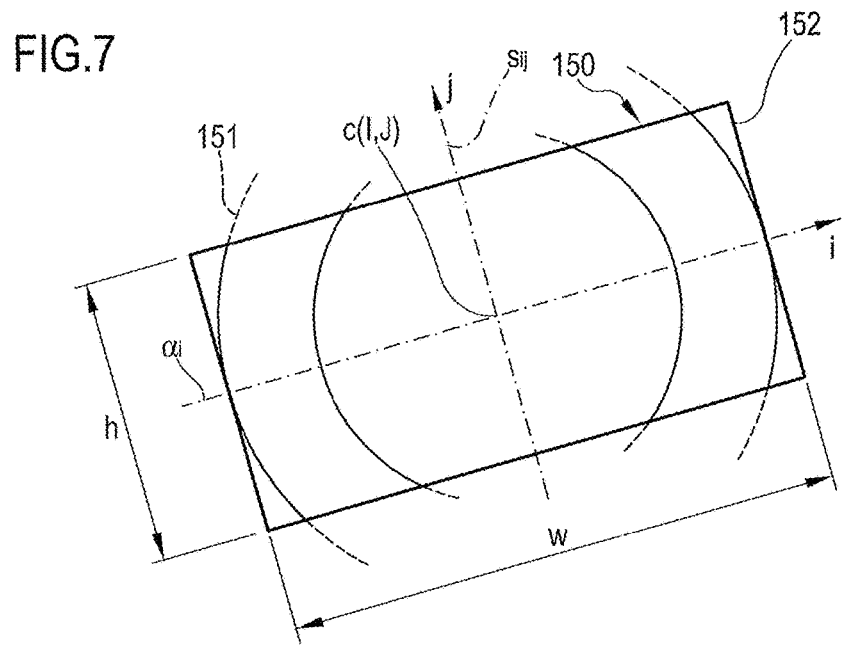

FIG. 4 schematically shows elements of the checking station of FIG. 3;

FIG. 5 schematically shows a flow diagram of a preferred embodiment of an algorithm that can be used to carry out the method for estimating the centre of a tyre according to the invention;

FIG. 6 schematically shows m potential axes of symmetry $s_{i1}, s_{i2}, \ldots s_{ij}, \ldots s_{im}$ perpendicular to an analysis direction $\alpha_i$ that can be used in the algorithm of FIG. 5;

FIG. 7 schematically shows a region of interest of analysis that can be used in the algorithm of FIG. 5;

FIGS. 8a-8e schematically show the result of operations that can be carried out in the algorithm of FIG. 5 to determine a probability distribution that the centre of the tyre is located on pixels of the image lying on the potential axes of symmetry $s_{i1}, s_{i2}, \ldots s_{ij}, \ldots s_{im}$ of FIG. 6;

FIGS. 9a-9e schematically show the determination of a cumulative probability distribution $P^{merged}$ that can be implemented in the algorithm of FIG. 5.

Figure 1:
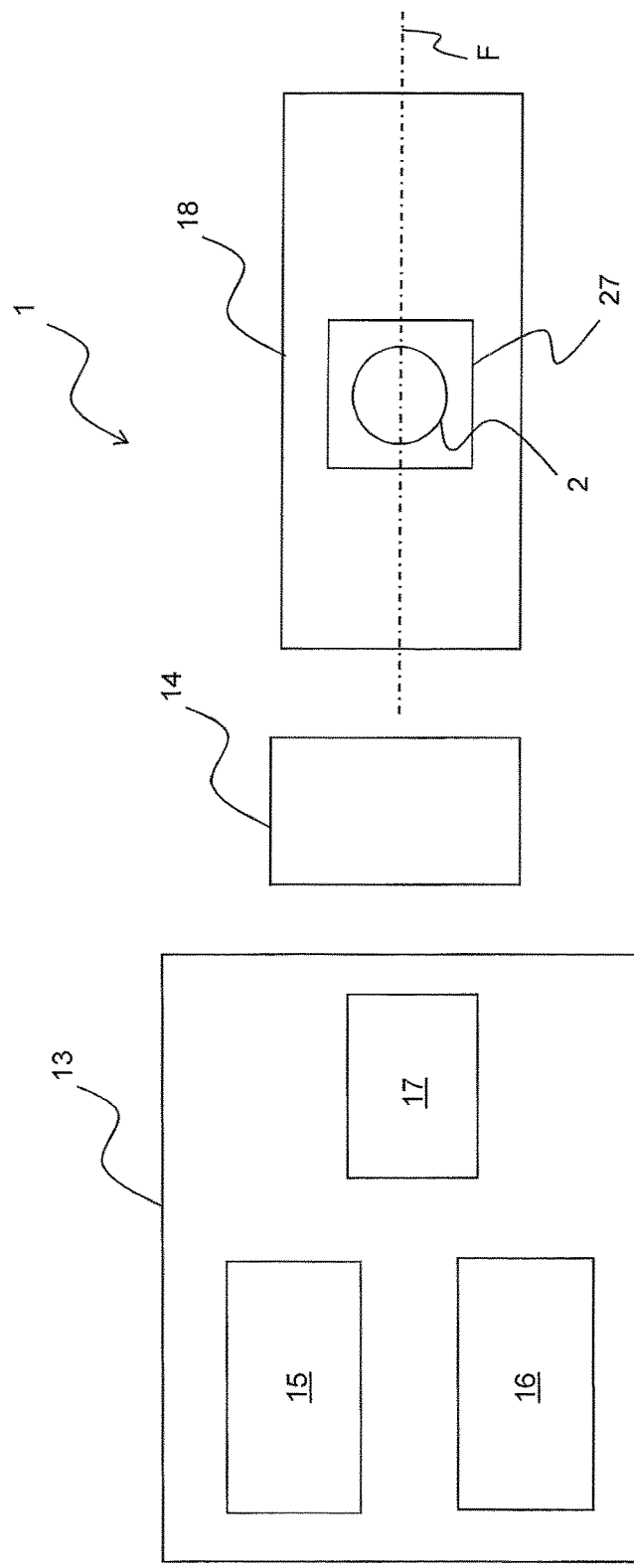

FIG. 1 shows a plant 1 for producing tyres 2 for vehicle wheels.

Figure 2:
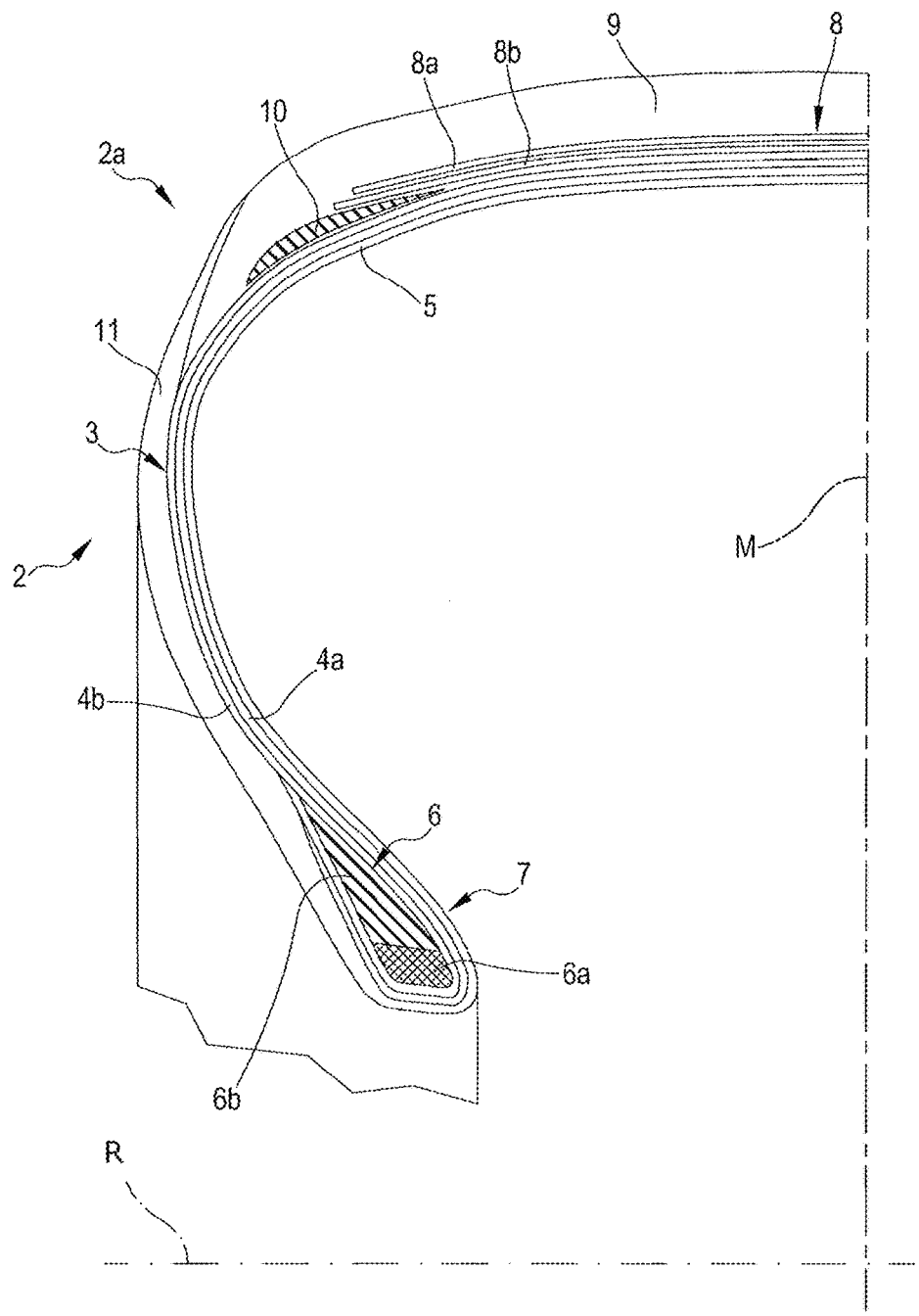
FIG. 2 shows a radial half-section of a tyre, taken in a plane that contains the axis of rotation and a radius of the tyre.

FIG. 2 shows an example of a tyre 2 that can be produced in the plant 1.

The tyre 2 has an axis of rotation R and a middle plane M perpendicular to the axis of rotation R (it should be observed that in FIG. 2 the position of the axis of rotation R with respect to the section of the tyre 2 is shown in a totally indicative and schematic manner). The middle plane M divides the tyre 2 into a first axial half 2a and into a second axial half 2b. For the sake of simplicity of illustration, FIG. 2 shows only the first axial half 2a of the tyre 2, the other half 2b being substantially specular (apart from the tread pattern that may not be symmetrical with respect to the aforementioned middle plane M).

The tyre 2 essentially comprises a carcass structure 3 having one or two carcass plies 4a, 4b. A layer of impermeable elastomeric material or so-called liner 5 is applied inside the carcass ply(-ies) 4a, 4b. Two annular anchoring structures 6 (only the axial half of which 2a is shown in FIG. 2) are engaged, in axially opposite positions (with respect to the middle plane M), with respective end edges of the carcass ply(-ies) 4a, 4b. The two annular anchoring structures 6 each comprise a so-called bead core 6a carrying an elastomeric filler 6b in radially outer position. The two annular anchoring structures 6 are integrated close to areas usually identified with the name "beads" 7 (only the axial half of which 2a is shown in FIG. 2), at which the engagement between the tyre 2 and a respective mounting rim usually takes place. A belt structure 8 comprising belt layers 8a, 8b is circumferentially applied about the carcass ply(-ies) 4a, 4b, and a tread band 9 is circumferentially juxtaposed on the belt structure 8. The belt structure 8 can comprise a further layer (not illustrated), known as zero degrees, in a radially outer position with respect to the aforementioned layers 8a, 8b. The belt structure 8 can be associated with so-called "sub-belt inserts" 10 each arranged between the carcass plies 4a, 4b and one of the axially opposite end edges of the belt structure 8. Two sidewalls 11, each extending from the corresponding bead 7 to a corresponding side edge of the tread band 9, are applied in axially opposite positions (with respect to the middle plane M) on the carcass plies 4a, 4b. The whole of the portion of each sidewall 11 close to the respective side edge of the tread band 9 and of each portion of the tread band 9 close to the respective sidewall 11 is known as shoulder of the tyre 2.

With particular reference to FIG. 1, the plant 1 comprises a building line 13 of green tyres and a moulding and vulcanization line 14 operatively arranged downstream of the building line 13.

In the non-limiting embodiment of the plant 1 illustrated in FIG. 1, the building line 13 comprises a carcass structure building line 15, a crown structure building line 16, each crown structure comprising at least the belt structure 8, the tread band 9, and possibly at least a part of the sidewalls 11, and a shaping and assembly station 17.

In the carcass structure building line 15, forming drums (not illustrated) are moved between different work stations (not illustrated) configured to form, on each forming drum, the carcass structure 3 comprising the carcass ply(-ies) 4a, 4b, the liner 5, the annular anchoring structures 6 and possibly at least a part of the sidewalls 11.

At the same time, in the crown structure building line 16, one or more auxiliary drums (not illustrated) are moved in sequence between different work stations (not illustrated) arranged to form a crown structure on each auxiliary drum.

In the shaping and assembly station 17 the carcass structure 3, formed on its own forming drum in the carcass structure building line 15, is shaped and assembled to the crown structure, formed in the crown structure building line 16.

In other embodiments of the plant 1, not illustrated, the building line 13 can be of a different type, for example arranged to form all of the aforementioned components on a single forming drum.

The green tyres built by the building line 13 are transferred to the moulding and vulcanization line 14 comprising one or more vulcanizers.

From the moulding and vulcanization line 14 the finished tyres 2 come out in sequence one after the other with a predetermined frequency and a corresponding predefined production cycle time.

Downstream of the moulding and vulcanization line 14, the plant 1 comprises an apparatus 18 configured to carry out the check of the tyres 2 after moulding and vulcanization.

In an additional or alternative embodiment (not illustrated), the plant 1 can comprise a same apparatus 18, arranged between the building line 13 and the moulding and vulcanization line 14, configured to carry out the check of the green tyres before the moulding and vulcanization step.

The apparatus 18 for checking tyres comprises at least one checking station 27 where the tyres 2 are subjected to quality controls in order to verify the possible presence of defects according to ways that will be described hereinafter. It should be observed that, for the sake of simplicity of illustration, FIG. 1 shows only one checking station 27 even though typically the apparatus 18 comprises many checking stations 27.

The tyres 2 to be checked enter one after the other in sequence into the apparatus 18 and cross the checking stations 27 in sequence along a substantially rectilinear advancing direction F.

With particular reference to FIGS. 3 and 4, each checking station 27 comprises a frame 28 in which a base 34 (FIG. 4) is housed resting on the ground. A rotating table 35 is mounted on the base 34, so as to be able to rotate about a vertical axis of rotation Z. The rotating table 35 has a substantially horizontal supporting portion 36 configured to receive and support a sidewall 11 of the tyre 2 to be checked.

In accordance with the illustrated embodiment, the rotating table 35 comprises a rotating support 37 (FIG. 4) arranged above the base 34 and rotatably coupled with the base 34 about said vertical axis of rotation Z. The rotating support 37 is fixedly connected to a shaft 37A coming out from the base 34. The shaft 37A is connected to a moving device 38 (schematically illustrated in FIG. 4) installed in the base 34 and configured to make the rotating table 35 rotate about said vertical axis of rotation Z. The vertical axis of rotation Z is fixed (not mobile) with respect to the base 34 and with respect to the ground.

An endless conveyor 39 is mounted on the rotating support 37. In particular, the endless conveyor 39 comprises a slide 40 (FIG. 4) defined by a plate provided, on a lower face thereof, with a pair of sliding blocks 41 (FIG. 4). Each of the sliding blocks 41 is slidably engaged with a respective guide 42 (FIG. 4) mounted on an upper face of the rotating support 37.

The slide 40 carries, on an upper face thereof, a pair of rollers 43 hinged on brackets that are not illustrated and fixedly connected to the slide 40. The rollers 43 are mobile in rotation about respective axes of revolution W parallel to one another and parallel to the guides 42. A conveyor belt 44 is wound on the pair of rollers 43 to define a closed path. The conveyor belt 44 has an upper branch the upper surface of which defines said supporting portion 36 that therefore lies substantially in a horizontal plane.

A first actuator 45 (schematically illustrated in FIG. 4) is mounted on the slide 40 and is operatively connected to at least one of the two rollers of the pair 43 to set it in rotation and move the conveyor belt 44 along the closed path. The rollers 43 can be made to rotate in one direction of rotation or the opposite way to generate the translation of the upper branch and of the supporting portion 36 in a first direction x (illustrated in FIG. 3), both in one way and in the opposite way. The first direction x lies in the horizontal plane and is perpendicular to the axes of revolution W. With the rotating table 35 stationary in rest position, the first direction x is aligned with the advancing direction F.

A second actuator 46, schematically illustrated in FIG. 4, is mounted between the slide 40 and the rotating support 37 and is configured to move the slide 40 on the guides 42 along a second direction y (illustrated in FIG. 3) that in the horizontal plane is perpendicular to the first direction x and parallel to the axes of revolution W. The supporting portion 36 is therefore mobile in the horizontal plane according to said two directions x, y with respect to the vertical axis of rotation Z that, on the other hand, is fixed with respect to said supporting portion 36. The movement of the supporting portion 36 along the first direction x can be continuous and endless.

The movement of the supporting portion 36 along the second direction y is limited by the available stroke provided by the system consisting of the sliding blocks 41 and the guides 42.

In a different embodiment, not illustrated, instead of the conveyor belt 44, the endless conveyor 39 comprises a plurality of motorised rollers parallel to one another and mounted on the rotating support 37. In this case, the assembly of the upper surfaces of said motorised rollers defines said supporting portion 36.

An image acquisition device 47 (schematically illustrated in FIG. 3) is installed above the rotating table 35 and faces towards the supporting portion 36. The image acquisition device 47 comprises a camera and a plurality of illumination devices (not illustrated) arranged at the checking station 27.

The camera is positioned above the rotating table 35 with the lens facing downwards (in other words towards the tyre 2 laid on the supporting portion 36). Thanks to a suitable calibration procedure, the camera has optical axis substantially coincident with the vertical axis of rotation Z of the rotating table 35.

The illumination devices are configured to suitably illuminate at least sidewall 11, shoulder and bead 7 (and possibly at least a part of the tread band 9) exposed upwards (in other words towards the camera). The illumination devices are configured to suitably illuminate also the background of the tyre 2.

An electronic unit 48 (schematically illustrated in FIGS. 3 and 4) is operatively connected to the image acquisition device 47, to the moving device 38, to the first actuator 45 and to the second actuator 46. As described in greater detail hereinafter, the electronic unit 48 is configured to detect a deviation S between the vertical axis of rotation Z of the rotating table 35 and the axis of rotation R of the tyre 2 arranged on the supporting portion 36 and to control the first and the second actuator 45, 46 so as to move the supporting portion 36 according to the first x and/or second direction y as a function of the detected deviation S, until the axis of rotation of the tyre R is aligned with the axis of rotation Z of the rotating table 35.

In an embodiment (not illustrated), the apparatus 18 for checking tyres preferably also comprises, upstream of the checking stations 27, a mechanical centring support comprising a roller conveyor on which the tyre 2 is positioned before feeding it to the first checking station of the checking stations 27. Such a mechanical centring support is configured to carry out a pre-centring operation of the tyre 2 with respect to the axis of rotation Z of the rotating table 35, adapted for obtaining a deviation Sy along the second direction y, between the vertical axis of rotation Z of the rotating table 35 and the axis of rotation R of the tyre 2, for example less than 20-25 mm (pre-centring along the second direction y).

As shown in FIG. 3, each checking station 27 also comprises one or more anthropomorphic robotized arms 49 (as an example in FIG. 3 two of them are shown) mounted above the rotating table 35 and constrained to the frame 28.

An extreme end of each anthropomorphic robotized arm 49 carries one or more checking devices 50. The anthropomorphic robotized arms 49 define support and movement devices of devices 50. The devices 50 carried by the anthropomorphic robotized arms 49 are for example capable of carrying out a series of non-destructive checking operations that make it possible to detect possible external defects (on the radially outer and/or radially inner surface) and/or defects inside the structure of the tyre. Said checks can, for example, be of the optical (photography, shearography, holography, radiography, etc.), ultrasonic or mechanical type or a combination thereof.

As a non-exhaustive example, the devices 50 can comprise digital cameras with possible luminous sources with diffused, grazing or direct light, for example of the laser or LED type, configured to take two-dimensional and/or three-dimensional images of the radially outer and/or radially inner surface of the tyres 2.

In use and in accordance with the method for checking tyres according to the present invention, whenever a finished tyre 2 comes out from the vulcanization unit 14, it is transferred, for example through a conveyor that is not illustrated, to the apparatus 18 to carry out checking thereof.

The tyre 2 is then fed in each checking station 27 of the apparatus 18.

The tyre 2, not mounted on a rim (thus deflated), is rested with a sidewall 11 on the supporting portion 36 of the rotating table 35 of the checking station 27. The supporting portion 36 is oriented so that its first direction x coincides with the substantially rectilinear advancing direction F. The tyre 2 rested on the sidewall 11 has its second axial half 2b adjacent to the supporting portion 36 and the first axial half 2a facing upwards.

The resting on the sidewall 11 ensures that the shape of the tyre 2 is always the same during all of the tests without the need to inflate it. The tyre 2 at rest (deflated) reduces the vibrations thereof with respect to an inflated tyre and improves the quality of the checks, in particular of the images obtained. The resting on the sidewall avoids significant mechanical stresses that could compromise the integrity thereof and the quality of the checks. The resting on the sidewall also allows easy centring with respect to the reference system of the checks, as described hereinafter.

At this point the electronic unit 48 takes care of managing a centring operation adapted for aligning, in the horizontal plane x, y of the supporting portion 36 of the rotating table 35, the axis of rotation R of the tyre 2 with the vertical axis of rotation Z of the rotating table 35. The centring operation is carried out with a stationary rotating table 35, in rest position where the first direction x coincides with the advancing direction F. The centring operation firstly comprises the estimation of the position of the centre of the tyre and, therefore, of the axis of rotation R of the tyre.

FIG. 5 shows a preferred embodiment of an algorithm that can be used to implement the method for estimating the position of the centre of a tyre 2 for vehicle wheels according to the present invention.

In particular, with reference to the flow diagram of FIG. 5, at block 100 the algorithm receives input data including:
- an image, preferably two-dimensional, of the tyre 2 laid on said supporting portion 36 of the rotating table 35; the image being acquired from above, according to a side view of the tyre 2, through the image acquisition device 47;
- a data structure with the nominal dimensions of the internal radius, external radius and width of the tread band 9 of the tyre 2; and
- data obtained from the aforementioned calibration procedure, adapted for aligning the optical axis of the camera of the image acquisition device 47 with the vertical axis of rotation Z of the rotating table 35.

The two-dimensional image of the tyre 2 preferably comprises the sidewall 11, at least one shoulder portion, the bead 7 and, possibly, at least a part of the tread band 9 of the first axial half 2a of the tyre 2 facing upwards (in other words towards the camera).

The two-dimensional image is represented by a matrix of pixels having k and l as row and column indices, respectively. The value of the pixels can vary, for example, in a scale of levels of grey between 0 (black) and 255 (white).

The calibration procedure enables to characterise the geometry of the optical system of the image acquisition device 47 and enables to map the coordinates of a point in pixels on the two-dimensional image with the relative position in the 3D Cartesian reference system of the checking station 27 defined by the first direction x, by the second direction y and by the axis of rotation Z of the rotating table 35. In order to do this it is necessary to know the distance of said point from the camera. Considering that the algorithm considers the points of the sidewall 11, shoulder and bead 7 of the first axial half 2a of the tyre 2 facing upwards, knowing the height of the support plane 36 with respect to the camera and the width of the tread band 9, it is possible to pass from pixels to millimeters and vice-versa, for all of the points belonging to the plane of the sidewall 11 facing upwards of the tyre 2.

Preferably, the image in input is filtered with a conventional median filter, for example of the 3×3 type, for the removal of noise and to make the levels of grey of the image more even.

At block 101, the algorithm considers, in the acquired image, a first analysis direction $\alpha_i$ of n analysis directions $\alpha_1, \alpha_2, \ldots \alpha_i, \ldots \alpha_n$ that intersect each other at a selected central point Pc (provided in input from block 102), where n and i are integers, with n>1 and i indicating a generic integer from 1 to n. Preferably, n is greater than 2. The number n of analysis directions is preferably selected so as to find a good compromise between robustness and accuracy of the algorithm on the one hand and computing simplicity on the other. Preferably, the n analysis directions $\alpha_1, \alpha_2, \ldots \alpha_i, \ldots \alpha_n$ are equally angularly spaced. For example, m is equal to 12 and the n analysis directions $\alpha_1, \alpha_2, \ldots \alpha_i, \ldots \alpha_n$ are angularly spaced apart by 30°. Preferably, as explained better hereinafter, at the first iteration of the algorithm, the selected central point Pc is set equal to the centre (in pixels) of the rotating table 35.

At block 103, the algorithm considers, in the acquired image, for the analysis direction $\alpha_i$, a first potential axis of symmetry $s_{ij}$ of m potential axes of symmetry $s_{i1}, s_{i2}, \ldots s_{ij}, \ldots s_{im}$, perpendicular to the analysis direction $\alpha_i$, where m and j are integers, with m>1 and j indicating a generic integer from 1 to m. As schematically illustrated in FIG. 6, preferably the m potential axes of symmetry $s_{i1}, s_{i2}, \ldots s_{ij}, \ldots s_{im}$ are equidistant within an excursion E that is predefined (in pixels) along said analysis direction $\alpha_i$ and is centred in the selected central point Pc. For example, as explained in detail hereinafter, at the first iteration of the algorithm the excursion E can have a total length of 300 pixels and the m potential axes of symmetry $s_{i1}, s_{i2}, \ldots s_{ij}, \ldots s_{im}$ can be spaced apart by a distance d equal to 10 pixels (for a total of 30 axes of symmetry, in other words m=30). The value of such an excursion E and of the distance d are provided at block 103 of FIG. 5 by the block 104. As explained in detail hereinafter, the excursion E and the distance d in pixels between the axes of symmetry are variable parameters of the algorithm (in other words that vary from one iteration to the next).

At block 105, the algorithm defines a region of interest (ROI) 150 within the acquired image for said first potential axis of symmetry $s_{ij}$ considered. As schematically illustrated in FIG. 7, such a region of interest 150 is symmetrical with respect to the potential axis of symmetry $s_{ij}$ and is defined by the intersection between: an annulus 151 having inner and outer radius respectively sized as a function of the nominal values (in pixels) of the inner and outer radius of the tyre (received as data in input to the block 100) and a rectangle 152 having major centreline lying on the analysis direction $\alpha_i$ and minor centreline lying on the potential axis of symmetry $s_{ij}$ considered. Preferably, the rectangle 152 has a length w along the analysis direction $\alpha_i$ slightly greater (for example about 1 or 2%) than the length (in pixels) of the external diameter of the tyre and a height h along the potential axis of symmetry $s_{ij}$ substantially equal to the length (in pixels) of the external radius of the tyre. The centre c of the rectangle 152 is in the point of intersection between the analysis direction $\alpha_i$ and the potential axis of symmetry $s_{ij}$. In FIG. 7, the centre c has generic coordinates I,J in a Cartesian plane i, j, where i represents the coordinates along the analysis direction $\alpha_i$ and j the coordinates along the potential axis of symmetry $s_{ij}$.

Preferably, the internal radius of the annulus 151 is slightly greater (for example about 1-2%) than the nominal value (in pixels) of the internal radius of the tyre 2.

Preferably, the external radius of the annulus 151 is slightly greater (for example about 1-2%) than the nominal value (in pixels) of the external radius of the tyre 2.

At block 106, the algorithm calculates a level of anti-symmetry $AS^{\alpha_i s_{ij}}$ of the image with respect to the potential axis of symmetry $s_{ij}$ considered. In particular, the level of anti-symmetry $AS^{\alpha_i s_{ij}}$ is determined by calculating the root mean square deviation between the grey intensity In of a certain number p of pixels of the image that are located on one side of the image with respect to the potential axis of symmetry $s_{ij}$ and the grey intensity In of specular pixels that are located on the opposite side of the image with respect to the potential axis of symmetry $s_{ij}$; the number p of pixels being provided to block 106 by block 107.

The calculation of the root mean square deviation can, for example, be represented schematically by the following formula:

$$AS^{\alpha_i s_{ij}} = \sqrt{\frac{1}{p}\sum_{i=0}^{w/2}\sum_{j=-h/2}^{h/2}(In_{I+i,J+j} - In_{I-i,J+j})^2}$$

where p indicates the number of pixels considered, In indicates the grey intensity of the pixel; h and w respectively indicate the height and the length of the rectangle 152; I and J the coordinates of the centre c of the rectangle 152; i and j the coordinates of the pixel with respect to the centre c of the rectangle 152 along the analysis direction $\alpha_i$ and along the potential axis of symmetry $s_{ij}$ respectively. As explained in detail hereinafter with reference to blocks 113 and 116, the number p of pixels considered is a variable parameter of the algorithm (in other words it varies from one iteration to the next). Moreover, it should be observed that even if in the formula it is schematically indicated that the coordinate i varies from 0 to w/2 and the coordinate j varies from h/2 to –h/2, in reality only pixels with coordinates i, j that fall within the annulus 151 are considered.

It should be observed that if $AS^{\alpha_i s_{ij}}$ has a high value, it means that the two opposite sides of the image with respect to the potential axis of symmetry $s_{ij}$ are very different (not symmetrical) from one another; if $AS^{\alpha_i s_{ij}}$ is equal to zero, on the other hand, it means that the two sides are perfectly symmetrical. A high value of $AS^{\alpha_i s_{ij}}$ is, therefore, indicative of a low probability that the considered potential axis of symmetry $s_{ij}$ is a diameter of the tyre. On the other hand, a low value of $AS^{\alpha_i s_{ij}}$ is indicative of a high probability that the considered potential axis of symmetry $s_{ij}$ is a diameter of the tyre.

As stated above, the internal radius of the annulus 151 is preferably slightly greater than the nominal value (in pixels) of the internal radius of the tyre 2. In this way, possible asymmetric burrs present on the bead 7 of the tyre are excluded a priori from the analysis, avoiding falsifying the calculated level of anti-symmetry $AS^{\alpha_i s_{ij}}$ of the image.

The external radius of the annulus 151 is also preferably slightly greater than the nominal value of the external radius of the tyre 2 to include in the analysis a small band of pixels of the background. In this way, as can be understood from the representation of FIG. 8a, if the region of interest 150 is not perfectly centred with respect to the actual centre of the tyre 2, such pixels (generally lighter or in any case of a different level of grey from that of the pixels of the tyre) compared with specular dark pixels of the tyre 2, contribute to rapidly increasing the value of the level of anti-symmetry $AS^{\alpha_i s_{ij}}$. If, on the other hand, the region of interest 150 is centred, the pixels of the background are compared with other pixels of the background in the opposite side and their contribution to the value of the level of anti-symmetry $AS^{\alpha_i s_{ij}}$ is zero. This advantageously makes it possible to have cleaner transitions in the trend of the level of anti-symmetry $AS^{\alpha_i, s_{ij}}$ of the image along the direction $\alpha_i$.

At block 108, the algorithm checks whether all of the m potential axes of symmetry $s_{i1}, s_{i2}, \ldots s_{ij}, \ldots s_{im}$ have been analysed. In the negative case, the algorithm returns to block 103 where it restarts the analysis for another potential axis of symmetry $s_{ij}$ not yet considered in order to calculate the level of anti-symmetry $AS^{\alpha_i, s_{ij}}$ of the image with respect to such an axis. If, on the other hand, all of the m potential axes of symmetry $s_{i1}, s_{i2}, \ldots s_{ij}, \ldots s_{im}$ have been analysed (in other words the levels of anti-symmetry $AS^{\alpha_i, s_{ij}}$ of the image have been calculated for all of the m potential axes of symmetry $s_{i1}, s_{i2}, \ldots s_{ij}, \ldots s_{im}$ perpendicular to the analysis direction $\alpha_i$), at block 109 the algorithm determines, from the level of symmetry $AS^{\alpha_i, s_{ij}}$ of the image calculated with respect to each of said potential axes of symmetry $s_{i1}, s_{i2}, \ldots s_{ij}, \ldots s_{im}$, a probability distribution $P^{\alpha_i}$ that is indicative of the probability that the centre of the tyre is located on pixels of the image lying on said potential axes of symmetry $s_{i1}, s_{i2}, \ldots s_{ij}, \ldots s_{im}$ (in other words the probability that a diameter of the tyre is located on said potential axes of symmetry $s_{i1}, s_{i2}, \ldots s_{ij}, \ldots s_{im}$).

In particular, the probability distribution $P^{\alpha_i}$ is determined through:
- the calculation of the second derivative of the levels of anti-symmetry $AS^{\alpha_i, s_{i1}}, AS^{\alpha_i, s_{i2}}, \ldots AS^{\alpha_i, s_{ij}}, \ldots AS^{\alpha_i, s_{im}}$ of the image (in other words root mean square deviations) calculated for each of said potential axes of symmetry $s_{i1}, s_{i2}, \ldots s_{ij}, \ldots s_{im}$ perpendicular to the analysis direction $\alpha_i$; and
- the filtering of the calculated second derivative, carried out by setting all of the values of the second derivative that are below a certain threshold value equal to zero.

The filtering advantageously makes it possible to eliminate the negative values (which are not interesting for the purposes of the calculation of the probability distribution $P^{\alpha_i}$) and slight disturbance peaks.

Figure 8:
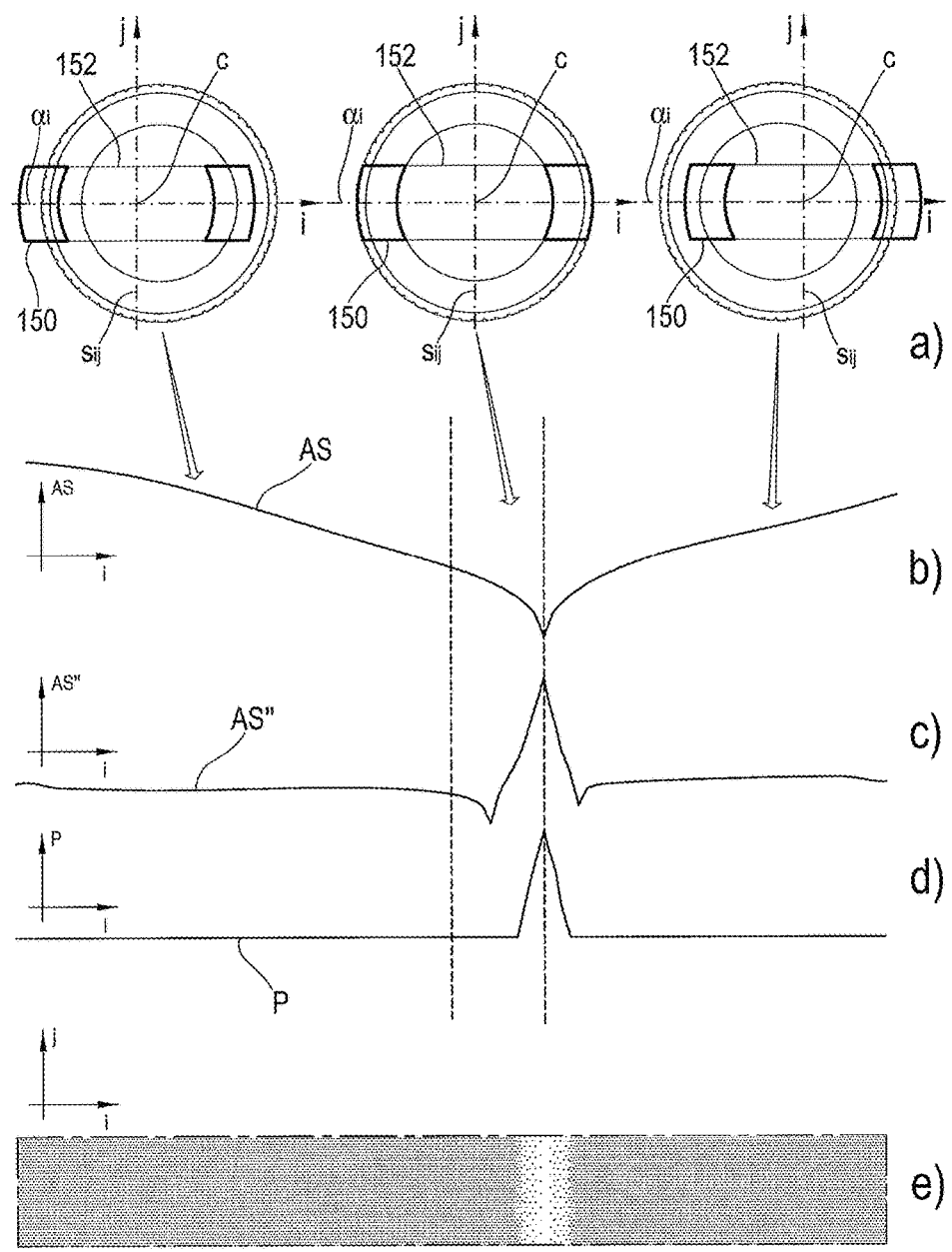

The aforementioned operations are schematically illustrated in FIG. 8 where: FIG. 8b schematically shows a curve AS that represents the levels of anti-symmetry of the image $AS^{\alpha_i, s_{i1}}, AS^{\alpha_i, s_{i2}}, \ldots AS^{\alpha_i, s_{ij}}, \ldots AS^{\alpha_i, s_{im}}$ calculated along the analysis direction $\alpha_i$ for the m potential axes of symmetry $s_{i1}, s_{i2}, \ldots s_{ij}, \ldots s_{im}$; FIG. 8c schematically shows a curve AS" that represents the second derivative of the curve AS; and FIG. 8d schematically shows a curve P that represents the probability distribution $P^{\alpha_i}$ obtained by filtering the curve AS".

As can be seen from FIGS. 8b-8d, the curves AS" and P have a maximum peak at the minimum of the curve AS. The curves AS" and P are therefore indicative of the level of symmetry of the image along the analysis direction $\alpha_i$ for the m potential axes of symmetry $s_{i1}, s_{i2}, \ldots s_{ij}, \ldots s_{im}$ and, therefore, of the probability that the centre of the tyre is located on one of the m potential axes of symmetry $s_{i1}, s_{i2}, \ldots s_{ij}, \ldots s_{im}$. In particular, the greater the value of P for a potential axis of symmetry $s_{ij}$ the greater the probability that the diameter of the tyre 2 lies on such an axis of symmetry $s_{ij}$.

It should be observed that in FIG. 8d the curve P represents the probability distribution $P^{\alpha_i}$ one-dimensionally, in other words along the analysis direction $\alpha_i$. However, as stated above, in reality the probability distribution $P^{\alpha_i}$ is two-dimensional since it is indicative of the probability that the centre of the tyre lies along the m potential axes of symmetry $s_{i1}, s_{i2}, \ldots s_{ij}, \ldots s_{im}$. In FIG. 8e the curve P is therefore represented in 2D by an image having pixels that are increasingly light the higher the probability distribution $P^{\alpha_i}$, in a plane i, j where i represents the coordinate along the analysis direction $\alpha_i$ and j the coordinate along a direction perpendicular to the analysis direction $\alpha_i$ and parallel to the potential axes of symmetry $s_{i1}, s_{i2}, \ldots s_{ij}, \ldots s_{im}$. As can be seen, the pixels of the image are increasingly light at the peak of the curve P of FIG. 8d. As represented in FIG. 8e, the 2D image can be a rectangle having, for example, extension along the direction i equal to the excursion E and generic extension along the direction j. In a preferred embodiment (not illustrated), the 2D image is a square having extension both along the direction i and along the direction j equal to the excursion E (that is generally less than the height h of the rectangle 152).

Going back to the flow diagram of FIG. 5, at block 110 the algorithm checks whether all of the n of analysis directions $\alpha_1, \alpha_2, \ldots \alpha_i, \ldots \alpha_n$ have been analysed. In the negative case, the algorithm goes back to block 101 where it restarts the analysis for another analysis direction $\alpha_i$ not yet considered in order to calculate the probability distribution $P^{\alpha_i}$ with respect to such an analysis direction. If, on the other hand, all of the n analysis directions $\alpha_1, \alpha_2, \ldots \alpha_i, \ldots \alpha_n$ have been analysed (in other words all of the probability distributions $P^{\alpha_1}, P^{\alpha_2}, \ldots P^{\alpha_i}, \ldots P^{\alpha_n}$ have been calculated for all of the n analysis directions $\alpha_1, \alpha_2, \ldots \alpha_i, \ldots \alpha_n$), at block 111 the algorithm determines a cumulative probability distribution $P^{merged}$ that combines the probability distributions $P^{\alpha_1}, P^{\alpha_2}, \ldots P^{\alpha_i}, \ldots P^{\alpha_n}$ calculated for all of the analysis directions $\alpha_1, \alpha_2, \ldots \alpha_i, \ldots \alpha_n$.

For each pixel of the two-dimensional image of the tyre 2 (received in input at block 100), having generic row and column indices k and l, the cumulative probability distribution $P_{k,l}^{merged}$ is given by the product of the values of the probability distribution $P^{\alpha_i}$ obtained along all of the n analysis directions $\alpha_1, \alpha_2, \ldots \alpha_i, \ldots \alpha_n$ at such a pixel of coordinates k,l. Such $P_{k,l}^{merged}$ can, for example, be represented schematically by the following formula:

$$P_{k,l}^{merged} = \prod_{i=1}^{n} (1 + P_{k,l}^{\alpha i}).$$

where $P_{k,l}^{\alpha i}$ represents the value of the probability distribution $P^{\alpha_i}$ calculated at block 109 at the pixel of coordinates k,l. The passage from the coordinates i, j to the coordinates k,l can be carried out through suitable mathematical relationships within the capabilities of those skilled in the art.

It should be observed that the unit "1" in the factors of the multiplication Π prevents $P_{k,l}^{merged}$ from being zero even when only one $P^{\alpha_i}$ (in other words the probability along a single analysis direction) is equal to zero. This makes it possible not to give too much weight to possible occlusions or disturbances present in a single analysis direction of the image of the tyre 2.

Preferably, in the calculation of $P_{k,l}^{merged}$ only the values of $P_{k,l}^{\alpha i}$ are considered for which the probability distribution $P^{\alpha_i}$ (in other words the curve P of FIG. 8d) has a peak (of value or "score") above a certain threshold. Considering that a low peak value corresponds to a situation of uncertainty, this ensures robustness in the case of occlusions or disturbances in particular directions of the acquired image of the tyre 2.

Preferably, at block 111, $P_{k,l}^{merged}$ is finally normalised as represented by the following formula:

$$P_{k,l}^{normalized} = \frac{P_{k,l}^{merged}}{\sum_{k,l} P_{k,l}^{merged}}$$

FIG. 9e schematically represents the cumulative probability distribution $P^{merged}$ as a juxtaposition of 2D images (of the type of that of FIG. 8e) that are representative of the probability distributions $P^{\alpha_1}$, $P^{\alpha_2}$, ... $P^{\alpha_i}$, ... $P^{\alpha_n}$, obtained for all of the analysis directions $\alpha_1$, $\alpha_2$, ... $\alpha_i$, ... $\alpha_n$.

Figure 9:
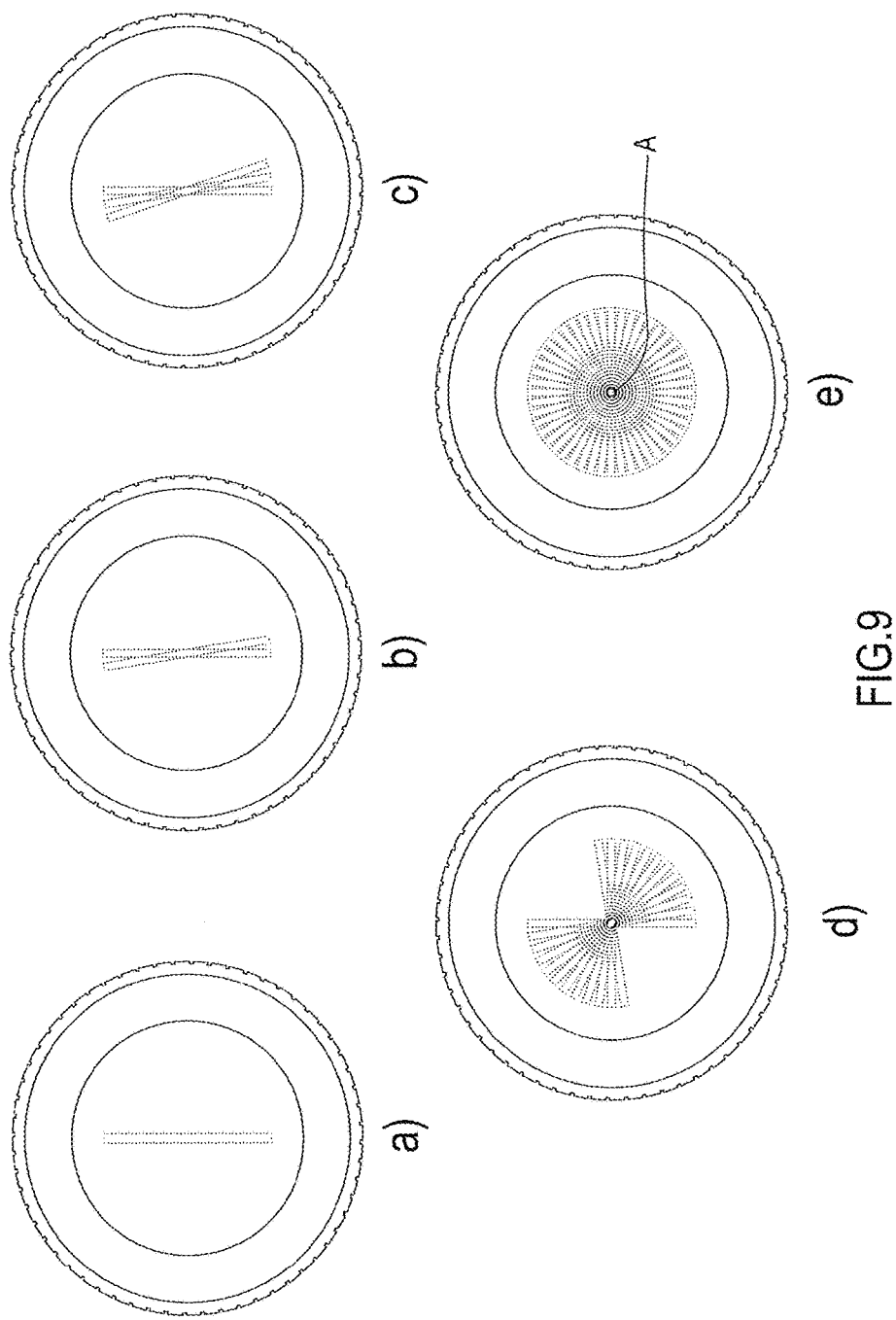

It should be observed that such 2D images are all anchored at the same point (in other words at the selected central point Pc in input to block 101 from block 102). Such images can therefore be mapped on the two-dimensional image of the tyre 2 (the one received in input at the block 100), as shown in FIG. 9.

In particular, FIGS. 9a-9e respectively show 1, 2, 3, i and n 2D images mapped on the two-dimensional image of the tyre 2.

As can be seen, the combination of the n 2D images leads to the identification in the two-dimensional image of the tyre 2 of a region A (see the whitest central spot) of maximum value of said cumulative probability distribution $P^{merged}$, in other words of maximum intensity value of the pixels.

Going back to the flow diagram of FIG. 5, at block 112 the algorithm estimates the centre of the tyre on the basis of the normalised cumulative probability distribution $P^{normalised}$ determined at block 111.

According to an embodiment of the invention, the centre of the tyre is identified in the pixel k,l of the two-dimensional image of the tyre 2 in which $P^{normalised}$ has an absolute maximum.

However, considering that $P^{normalised}$ is a discrete function (obtained from a discrete analysis of the two-dimensional image of the tyre 2), in order to make the estimation more accurate and include in the estimation of the centre also pixels k,l normalized of the image for which no value of $P_{k,l}^{normalised}$ has been calculated, according to a preferred embodiment of the invention, the centre of the tyre is estimated by identifying a region of the image of the tyre 2 of maximum values of said normalised cumulative probability distribution $P^{normalized}$ and calculating the barycentre of said region. Said region is schematically represented in FIG. 9e by the region A.

Preferably, this is carried out as follows:
a) the absolute maximum $P^{max}$ of $P^{normalised}$ is calculated;
b) the pixels of coordinates k,l of the image are selected such that $P_{k,l}^{normalised} > k*P^{max}$ (in other words, the pixels of coordinates k,l of the image, having a greater value than a certain percentage K of the maximum value $P^{max}$, for example k=0.8, are selected); and
c) the coordinates $C_k$, $C_l$ of the centre of the tyre are estimated by calculating the barycentre of the pixels selected according to the following formula:

$$C_k = \frac{\sum k * P_{k,l}^{normalized}}{\sum P_{k,l}^{normalized}}; C_l = \frac{\sum l * P_{k,l}^{normalized}}{\sum P_{k,l}^{normalized}}$$

Where, as stated above, k and l represents the row and column indices of the selected pixels.

In the case in which at point b) there are disjointed regions of maximum value of said cumulative probability distribution $P_{k,l}^{normalised}$, it is possible to consider only the region containing the absolute maximum $P^{max}$. Considering, however, that the presence of many disjoined regions is indicative of poor quality of the estimation carried out, alternatively or in addition, it is possible to foresee the emission of an error message by the algorithm.

At block 113, the algorithm checks whether a predefined number of iterations of the algorithm has been completed. Preferably, the predefined number of iterations is at least equal to 2. As the number of iterations increases, the robustness and accuracy of the algorithm increases. The number of iterations is preferably selected so as to find a good compromise between robustness and accuracy on the one hand and computing simplicity on the other. A good compromise can, for example, be obtained with 3 or 4 iterations.

In the affirmative case, at block 114 the coordinates in pixels $C_k$, $C_l$ of the estimated centre of the tyre are mapped in 3D in the Cartesian reference system of the work station 27, defined by the first direction x, the second direction y and the axis of rotation Z, as described above with reference to the block 100. Thereafter, at block 115, the algorithm ends.

If, on the other hand, the predefined number of iterations of the algorithm has not been completed, the algorithm carries out at block 116 an update of the selected central point Pc, of the excursion E, of the distance d between the potential axes of symmetry and of the number of pixels p to be analysed respectively at blocks 102, 104 and 107; after this, the algorithm starts again from block 101.

In particular, the selected central point Pc is set equal to the centre of the tyre estimated at block 112 (said selected central point Pc being set equal to the centre (in pixels) of the rotating table 35 at the first iteration of the algorithm). Moreover, the values of the excursion E and of the distance d are reduced whereas the number p of pixels analysed from one side to the other of the image with respect to the potential axis of symmetry $s_{ij}$ is increased. This enables to carry out a pyramidal analysis of the image that enables to provide, at the first iteration, a quick and rough estimate of the centre of the tyre by analysing a greater area (in other words a greater excursion E about the preselected centre Pc) but under-sampled (in other words by analysing more distanced potential axes of symmetry $s_{i1}$, $s_{i2}$, ... $s_{ij}$, ... $s_{im}$ and a smaller number p of pixels of the image from one side to the other of the potential axis of symmetry). On the other hand, such a rough estimate of the centre of the tyre is used in the successive iterations to reduce the area of analysis (in other words to reduce the excursion E considered around such a roughly estimated centre) and at the same time increase the sampling of the image (in other words, analyse closer axes of symmetry and a greater number p of pixels). This pyramidal analysis advantageously makes it possible to optimise the accuracy of the estimation of the centre of the tyre on the one hand and the computing performance on the other.

For example, as far as the value of the excursion E is concerned, it is possible to foresee to halve it or more at each iteration passing, for example, from a value of 300 pixels at the first iteration, to a value of 150 pixels at the second iteration up to a value of 30 pixels at the last iteration (for example the third). Moreover, as far as the distance d between the potential axes of symmetry $s_{i1}$, $s_{i2}$, ... $s_{ij}$, ... $s_{im}$ is concerned, it can be provided to halve it or more at each iteration passing, for example, from a value of 10 pixels at the first iteration, to a value of 5 pixels at the second iteration up to a value of 1 pixel at the last iteration (for example the third). As far as the number p of pixels analysed from one side to the other of the image with respect to the potential axis of symmetry $s_{ij}$ is concerned, it is increased by reducing the sampling pitch of the pixels of the image that are located within the region of interest 150. For example, with reference to the formula shown above of the root mean square deviation $AS^{\alpha_i s_{ij}}$, the gap in variation of the indices i and j can be equal to 10 pixels at the first iteration, 5 pixels at the second iteration and 1 pixel at the last iteration (for example the third).

Once the estimation algorithm of the centre of the tyre has ended, the electronic unit 48 estimates the axis of rotation R of the tyre in an axis that passes through the estimated centre and is perpendicular to the substantially horizontal supporting portion 36 of the rotating table 35.

The electronic unit 48 then determines the deviation S present between the vertical axis of rotation Z of the rotating table 35 and the axis of rotation R of the tyre 2 thus identified.

The electronic management unit 48 thus controls the first actuator 45 and/or the second actuator 46 of the checking station 27 and moves the supporting portion 36 according to the first direction x and/or the second direction y as a function of the deviation S detected until, in the horizontal plane, the axis of rotation of the tyre R is aligned with the axis of rotation Z of the rotating table 35. The alignment is such as to make the detected deviation S less than a predetermined value, for example equal to or less than about 0.1 mm.

In an embodiment, if the deviation S determined by the electronic unit 48 is greater than a certain threshold, it is provided, after having carried out the centring operation, adapted for aligning the axis of rotation of the tyre R (estimated through a first execution of the estimation algorithm of the position of the centre of the tyre) with the axis of rotation Z of the rotating table 35, to repeat the centring operation again by carrying out the operations described above and, in particular, the estimation algorithm of the position of the centre of the tyre and, therefore, of the axis of rotation R thereof. This advantageously makes it possible to improve the reliability of the estimation of the position of the axis of rotation R of the tyre and, therefore, of the centring operation.

Thereafter, the anthropomorphic robotized arms 49 are moved in the manoeuvring space until the respective checking devices 50 are brought close to the tyre 2.

Holding the checking devices 50 in fixed position, the rotating table 35 and the tyre 2 are made to rotate about the vertical axis of rotation Z. During such a rotation, the devices 50 carry out a cycle of checks on the first axial half 2a of the tyre 2. Such checks can be carried out in successive cycles and at each cycle the checking devices 50 of the same checking station 27 are arranged in different positions to check different portions of the same tyre 2.

It should be observed that, once centred, the tyre 2 has its axis of rotation R substantially coincident with the vertical axis of rotation Z of the rotating table 35. In such a situation, the anthropomorphic robotized arms 49 can advantageously be positioned in the assigned positions as a function of the model of tyre 2, without risk of collision with the tyre 2 while it is in rotation on the rotating table 35. Moreover, the centring advantageously ensures that the acquired images during the rotation of the tyre 2 are properly focused and within the field of view of the camera(s).

Once the checking cycles have ended, the rotation of the rotating table 35 is stopped with the first direction x aligned with the feeding direction F and the anthropomorphic robotized arms 49 are moved away from the tyre 2.

The tyre 2 is thus unloaded from the first checking station 27 and fed into a subsequent checking station 27 of the apparatus 18 where the tyre 2 is centred and analysed with ways analogous to what described for the first checking station 27.

Once the inspection of the first axial half 2a of the tyre 2 has ended, the checks are preferably repeated on the second axial half 2b of the tyre in suitable checking stations 27 of the apparatus 18, with analogous ways to what described above for the first axial half 2a.

The invention claimed is:

1. A method for checking tyres for vehicle wheels, each tyre having an axis of rotation, said method comprising:
   feeding a tyre to be checked to a checking station with a sidewall of the tyre laid on a supporting portion of a rotating table, wherein the supporting portion lies on a plane and the rotating table has an axis of rotation perpendicular to said plane;
   carrying out a centring operation adapted to align, in said plane, the axis of rotation of the tyre with the axis of rotation of the rotating table,
   wherein the centring operation comprises the identification, in said plane, of the axis of rotation of the tyre by:
   a) acquisition, according to a side view, of an image of the tyre laid on said supporting portion of the rotating table;
   b) definition, in the acquired image, of a number n of analysis directions $\alpha_1, \alpha_2, \ldots \alpha_i, \ldots \alpha_n$ intersecting at one selected central point, with n and i integers, n>1 and 1≤i≤n;
   c) for each analysis direction $\alpha_i$:
      c1) definition, in the acquired image, of a number m of potential axes of symmetry $s_{i1}, s_{i2}, \ldots s_{ij}, \ldots s_{im}$, perpendicular to the analysis direction $\alpha_i$, where m and j are integers, with m>1 and 1≤j≤m;
      c2) calculating a level of symmetry of the image with respect to each of said potential axes of symmetry $s_{i1}, s_{i2}, \ldots s_{ij}, \ldots s_{im}$, wherein said level of symmetry is indicative of the probability that the centre of the tyre is on the respective potential axis of symmetry $s_{i1}, s_{i2}, \ldots s_{ij}, \ldots s_{im}$;
      c3) determination of a probability distribution $P^{\alpha_i}$ indicative of a variation of said level of symmetry along said analysis direction $\alpha_i$;
   d) determination of a centre of the tyre on the basis of a cumulative probability distribution $P^{merged}$ obtained through a combination of the probability distributions $P^{\alpha_i}$ determined for said analysis directions $\alpha_1, \alpha_2, \ldots \alpha_i, \ldots \alpha_n$;
   e) identification of the axis of rotation of the tyre on an axis passing through said determined centre and perpendicular to said plane.

2. The method according to claim 1, wherein said probability distribution $P^{\alpha_i}$ is determined on the basis of said calculation of a level of symmetry of the image with respect to each of said potential axes of symmetry $s_{i1}, s_{i2}, \ldots s_{ij}, \ldots s_{im}$.

3. The method according to claim 1, wherein in d), the centre of the tyre is identified by determining an area of the image of maximum values of said cumulative probability distribution $P^{merged}$ and calculating the barycentre of said area.

4. The method according to claim 1, wherein in d), the centre of the tyre is identified by selecting pixels of the image at which said cumulative probability distribution $P^{merged}$ takes values higher than a threshold, and calculating the barycentre of said pixels.

5. The method according to claim 1, wherein in d), the centre of the tyre is identified by identifying a pixel of the image in which said cumulative probability distribution $P^{merged}$ has maximum value.

6. The method according to claim 1, wherein b) to d) are iterated a predetermined number of times greater than or equal to 1, each time taking as selected central point the centre of the tyre estimated in the immediately preceding iteration.

7. The method according to claim 6, wherein at the first iteration, the selected central point corresponds to the centre of the rotating table.

8. The method according to claim 6, wherein at each iteration, the cumulative probability distribution $P^{merged}$ is obtained by analyzing closer potential axes of symmetry $s_{i1}$, $s_{i2}, \ldots s_{ij}, \ldots s_{im}$ with respect to the immediately preceding iteration.

9. The method according to claim 6, wherein at each iteration, the cumulative probability distribution $P^{merged}$ is obtained by analyzing potential axes of symmetry $s_{i1}$, $s_{i2}, \ldots s_{ij}, \ldots s_{im}$ along a reduced excursion E, with respect to the immediately preceding iteration, said excursion E extending along the analysis direction $\alpha_i$ and being centered in the selected central point.

10. The method according to claim 1, wherein for each analysis direction $\alpha_i$ and for each potential axis of symmetry $s_{ij}$, the level of symmetry of the image with respect to each of said potential axes of symmetry $s_{i1}, s_{i2}, \ldots s_{ij}, \ldots s_{im}$ is calculated by analyzing pixels of the acquired image that are located at two opposite sides of the image with respect to the potential axis of symmetry $s_{ij}$.

11. The method according to claim 6, wherein for each analysis direction $\alpha_i$ and for each potential axis of symmetry $s_{ij}$, the level of symmetry of the image with respect to each of said potential axes of symmetry $s_{i1}, s_{i2}, \ldots s_{ij}, \ldots s_{im}$ is calculated by analyzing pixels of the acquired image that are located at two opposite sides of the image with respect to the potential axis of symmetry $s_{ij}$, the analyzed pixels increasing in number at each iteration, with respect to the immediately preceding iteration.

12. The method according to claim 10, wherein the analyzed pixels are selected within a region of interest defined within the acquired image for each potential axis of symmetry $s_{ij}$ of each analysis direction $\alpha_i$.

13. The method according to claim 12, wherein for each potential axis of symmetry $s_{ij}$, said region of interest is symmetrical with respect to said potential axis of symmetry $s_{ij}$.

14. The method according to claim 12, wherein for each potential axis of symmetry $s_{ij}$ of each analysis direction $\alpha_i$, said region of interest is defined by the intersection between: an annulus having inner and outer radius respectively sized according to nominal values of the inner and outer radius of the tyre and a rectangle having major centreline on the analysis direction $\alpha_I$ and minor centreline on the potential axis of symmetry $s_{ij}$.

15. The method according to claim 14, wherein said rectangle has a length along the analysis direction $\alpha_i$ greater than or equal to the outer diameter of the tyre and a height along the potential axis of symmetry substantially equal to the outer radius of the tyre.

16. The method according to claim 1, wherein in c2), the calculation of the level of symmetry of the image with respect to each axis $s_{ij}$ of said potential axes of symmetry $s_{i1}$, $s_{i2}, \ldots s_{ij}, \ldots s_{im}$ comprises the calculation of a root mean square deviation $AS^{\alpha_i s_{ij}}$ between the intensity of the image pixels located on one side with respect to the potential axis of symmetry $s_{ij}$ and the intensity of specular pixels located on the opposite side of the image with respect to the potential axis of symmetry $s_{ij}$.

17. The method according to claim 16, wherein the calculation of the level of symmetry of the image with respect to each of said potential axes of symmetry $s_{i1}$, $s_{i2}, \ldots s_{ij}, \ldots s_{im}$ comprises the calculation of the second derivative of said root mean square deviation $AS^{\alpha_i s_{ij}}$.

18. The method according to claim 1, wherein, for each analysis direction $\alpha_i$, if the determined probability distribution $P^{\alpha i}$ has a maximum value lower than a predetermined threshold, the probability distribution $P^{\alpha i}$ is not considered in the obtainment of the cumulative probability distribution $P^{merged}$.

19. The method according to claim 1, wherein said cumulative probability distribution $P^{merged}$ is obtained by merging all the probability distributions $P^{\alpha i}$.

20. The method according to claim 1, wherein in a), the image is acquired with stationary rotating table.

21. The method according to claim 1, wherein the centring operation comprises obtainment of a deviation, on said plane, between the axis of rotation of the rotating table and the axis of rotation of the tyre.

22. The method according to claim 21, wherein in the presence of said deviation, the centring operation comprises the movement of the tyre on said plane, with respect to the axis of rotation of the rotating table, until the axis of rotation of the tyre is substantially aligned with the axis of rotation of the rotating table.

23. The method according to claim 1, wherein, after the centring operation, the rotating table is rotated together with the tyre about said axis of rotation of the rotating table and to carry out checks on said tyre while the rotating table and the tyre are in rotation.

24. An apparatus for checking tyres for vehicle wheels, each tyre having an axis of rotation, said apparatus comprising at least one checking station comprising:
a table rotating about an axis of rotation having a supporting portion configured to receive and support a sidewall of the tyre, the supporting portion lying on a plane perpendicular to the axis of rotation of the rotating table;
image acquisition devices adapted to acquire, according to a side view, an image of the tyre laid on said supporting portion of the rotating table;
an electronic unit configured to manage a centring operation adapted to align, on said plane, the axis of rotation of the tyre with the axis of rotation of the rotating table, wherein the centring operation comprises the identification, in said plane, of the axis of rotation of the tyre by:
definition, in the acquired image, of a number n of analysis directions $\alpha_1, \alpha_2, \ldots \alpha_i, \ldots \alpha_n$ intersecting at one selected central point, with n and i integers, n>1 and 1≤i≤n; wherein for each analysis direction $\alpha_i$:
a number m of potential axes of symmetry $s_{i1}, s_{i2}, \ldots s_{ij}, \ldots s_{im}$, perpendicular to the analysis direction $\alpha_I$, is defined in the acquired image, where m and j are integers, with m>1 and 1≤j≤m;
a level of symmetry of the image is calculated with respect to each of said potential axes of symmetry $s_{i1}, s_{i2}, \ldots s_{ij}, \ldots s_{im}$, wherein said level of symmetry is indicative of the probability that the centre of the tyre is on the respective potential axis of symmetry $s_{i1}, s_{i2}, \ldots s_{ij}, \ldots s_{im}$;

a probability distribution $P^{\alpha i}$ is determined, indicative of a variation of said level of symmetry along said analysis direction $\alpha_i$;

determination of a centre of the tyre on the basis of a cumulative probability distribution $P^{merged}$ obtained through a combination of the probability distributions $P^{\alpha}i$ determined for said analysis directions $\alpha_1, \alpha_2, \ldots \alpha_i, \ldots \alpha_n$;

identification of the axis of rotation of the tyre on an axis passing through said determined centre and perpendicular to said plane.

25. The apparatus according to claim 24, wherein said probability distribution $P^{\alpha i}$ is determined on the basis of said calculation of a level of symmetry of the image with respect to each of said potential axes of symmetry $s_{i1}, s_{i2}, \ldots s_{ij}, \ldots s_{im}$.

26. The apparatus according to claim 24, wherein the image acquisition devices comprise a camera positioned in such a way as to have optical axis substantially coincident with the axis of rotation of the rotating table.

27. The apparatus according to claim 24, wherein said at least one checking station comprises at least one actuator operatively connected to the supporting portion of the rotating table for moving said supporting portion according to two directions belonging to said plane.

28. The apparatus according to claim 27, wherein the electronic unit is configured to control said at least one actuator so as to move the supporting portion of the rotating table according to at least one of said two directions until the axis of rotation of the tyre is substantially aligned with the axis of rotation of the rotating table.

29. A method for estimating the position of the centre of a tyre for vehicle wheels, comprising:
   a) acquiring, according to a side view, an image of the tyre with a sidewall laid on a supporting portion lying on a plane,
   b) defining, in the acquired image, a number n of analysis directions $\alpha_1, \alpha_2, \ldots \alpha_i, \ldots \alpha_n$ intersecting at one selected central point, with n and i integers, n>1 and $1 \leq i \leq n$;
   c) for each analysis direction $\alpha_i$:
      c1) defining, in the acquired image, a number m of potential axes of symmetry $s_{i1}, s_{i2}, \ldots s_{ij}, \ldots s_{im}$, perpendicular to the analysis direction $\alpha_i$, where m and j are integers, with m>1 and $1 \leq j \leq m$;
      c2) calculating a level of symmetry of the image with respect to each of said potential axes of symmetry $s_{i1}, s_{i2}, \ldots s_{ij}, \ldots s_{im}$, wherein said level of symmetry is indicative of the probability that the centre of the tyre is on the respective potential axis of symmetry $s_{i1}, s_{i2}, \ldots s_{ij}, \ldots s_{im}$; and
      c3) determining a probability distribution $P^{\alpha i}$ indicative of a variation of said level of symmetry along said analysis direction $\alpha_i$;
   d) determining the position of the centre of the tyre on the basis of a cumulative probability distribution $P^{merged}$ obtained through a combination of the probability distributions $P^{\alpha i}$ calculated for said analysis directions $\alpha_1, \alpha_2, \ldots \alpha_i, \ldots \alpha_n$.

30. The method according to claim 29, wherein said probability distribution $P^{\alpha i}$ is determined on the basis of said calculation of a level of symmetry of the image with respect to each of said potential axes of symmetry $s_{i1}, s_{i2}, \ldots s_{ij}, \ldots s_{im}$.

31. The method according to claim 29, wherein in d), the centre of the tyre is identified by determining an area of the image of maximum values of said cumulative probability distribution $P^{merged}$ and calculating the barycentre of said area.

32. The method according to claim 29, wherein in d), the centre of the tyre is identified by selecting pixels of the image at which said cumulative probability distribution $P^{merged}$ takes values higher than a threshold, and calculating the barycentre of said pixels.

33. The method according to claim 29, wherein in d), the centre of the tyre is identified by identifying a pixel of the image in which said cumulative probability distribution $P^{merged}$ has maximum value.

34. The method according to claim 29, wherein b) to d) are iterated a predetermined number of times greater than or equal to 1, each time taking as selected central point the centre of the tyre estimated in the immediately preceding iteration.

35. The method according to claim 34, wherein at each iteration, the cumulative probability distribution $P^{merged}$ is obtained by analyzing closer potential axes of symmetry $s_{i1}, s_{i2}, \ldots s_{ij}, \ldots s_{im}$ with respect to the immediately preceding iteration.

36. The method according to claim 34, wherein at each iteration, the cumulative probability distribution $P^{merged}$ is obtained by analyzing potential axes of symmetry $s_{i1}, s_{i2}, \ldots s_{ij}, \ldots s_{im}$ along a reduced excursion E, with respect to the immediately preceding iteration, said excursion E extending along the analysis direction $\alpha_i$ and being centered in the selected central point.

37. The method according to claim 29, wherein for each analysis direction $\alpha_i$ and for each potential axis of symmetry $s_{ij}$, the level of symmetry of the image with respect to each of said potential axes of symmetry $s_{i1}, s_{i2}, \ldots s_{ij}, \ldots s_{im}$ is calculated by analyzing pixels of the acquired image that are located at two opposite sides of the image with respect to the potential axis of symmetry $s_{ij}$.

38. The method according to claim 34, wherein for each analysis direction $\alpha_i$ and for each potential axis of symmetry $s_{ij}$, the level of symmetry of the image with respect to each of said potential axes of symmetry $s_{i1}, s_{i2}, \ldots s_{ij}, \ldots s_{im}$ is calculated by analyzing pixels of the acquired image that are located at two opposite sides of the image with respect to the potential axis of symmetry $s_{ij}$, the analyzed pixels increasing in number at each iteration, with respect to the immediately preceding iteration.

39. The method according to claim 37, wherein the analyzed pixels are selected within a region of interest defined within the acquired image for each potential axis of symmetry $s_{ij}$ of each analysis direction $\alpha_i$.

40. The method according to claim 39, wherein for each potential axis of symmetry $s_{ij}$, said region of interest is symmetrical with respect to said potential axis of symmetry $s_{ij}$.

41. The method according to claim 39, wherein for each potential axis of symmetry $s_{ij}$ of each analysis direction $\alpha_i$, said region of interest is defined by the intersection between: an annulus having inner and outer radius respectively sized according to nominal values of the inner and outer radius of the tyre and a rectangle having major centreline on the analysis direction $\alpha_I$ and minor centreline on the potential axis of symmetry $s_{ij}$.

42. The method according to claim 29, wherein in c2) the calculation of the level of symmetry of the image with respect to each axis $s_{ij}$ of said potential axes of symmetry $s_{i1}, s_{i2}, \ldots s_{ij}, \ldots s_{im}$ comprises the calculation of a root mean square deviation $AS^{\alpha_i s_{ij}}$ between the intensity of the image pixels located on one side with respect to the potential axis of symmetry $s_{ij}$ and the intensity of specular pixels located on the opposite side of the image with respect to the potential axis of symmetry $s_{ij}$.

\* \* \* \* \*